US009681201B2

(12) United States Patent
Maruyama et al.

(10) Patent No.: US 9,681,201 B2
(45) Date of Patent: *Jun. 13, 2017

(54) COMMENT INFORMATION GENERATING APPARATUS AND COMMENT INFORMATION GENERATING METHOD

(71) Applicant: Panasonic Corporation, Osaka (JP)

(72) Inventors: Ayako Maruyama, Osaka (JP); Kunio Nobori, Osaka (JP); Koichi Hotta, Hyogo (JP); Shuhei Sasakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 213 days.

This patent is subject to a terminal disclaimer.

(21) Appl. No.: 14/204,469

(22) Filed: Mar. 11, 2014

(65) Prior Publication Data

US 2014/0196082 A1    Jul. 10, 2014

Related U.S. Application Data

(63) Continuation of application No. PCT/JP2013/004153, filed on Jul. 4, 2013.

(30) Foreign Application Priority Data

Jul. 17, 2012    (JP) .................................. 2012-158995

(51) Int. Cl.
*H04N 21/81*    (2011.01)
*H04N 21/234*    (2011.01)
(Continued)

(52) U.S. Cl.
CPC ......... *H04N 21/8133* (2013.01); *G06F 17/30* (2013.01); *G06T 7/20* (2013.01);
(Continued)

(58) Field of Classification Search
CPC ..... H04N 21/23412; H04N 21/234318; H04N 21/4307; H04N 21/6587; H04N 21/8133;
(Continued)

(56) References Cited

U.S. PATENT DOCUMENTS

2005/0195218 A1* 9/2005 Saito ........................ G06F 3/01
345/619
2011/0154192 A1* 6/2011 Yang ................... G06F 17/2288
715/256
(Continued)

FOREIGN PATENT DOCUMENTS

JP    2003-132047    5/2003
JP    2003-283981    10/2003
(Continued)

OTHER PUBLICATIONS

International Search Report issued Oct. 1, 2013 in corresponding International Application No. PCT/JP2013/004153.
(Continued)

*Primary Examiner* — Hai V Tran
(74) *Attorney, Agent, or Firm* — Wenderoth, Lind & Ponack, L.L.P.

(57) ABSTRACT

A comment information generating apparatus includes: a video obtaining unit which receives a video; a comment input receiving unit which receives position information of an object in the video and a comment that is displayed with the object and is caused to track the object starting from a predetermined timing; a target time determining unit which determines, to be a target value indicating a time length, a target time during which the comment is displayed, based on the comment; an object motion determining unit which determines, for the object, a motion trajectory having a time length substantially equal to the target time and along which the comment is caused to track the object; a comment information generating unit which generates comment infor-
(Continued)

mation including the comment and the motion trajectory of the object; and an output unit which outputs the comment information.

18 Claims, 15 Drawing Sheets

(51) Int. Cl.
| | |
|---|---|
| *H04N 21/2343* | (2011.01) |
| *H04N 21/4788* | (2011.01) |
| *H04N 21/6587* | (2011.01) |
| *H04N 21/84* | (2011.01) |
| *G09G 5/00* | (2006.01) |
| *G09G 5/38* | (2006.01) |
| *H04N 21/235* | (2011.01) |
| *H04N 21/488* | (2011.01) |
| *H04N 21/845* | (2011.01) |
| *G06T 7/20* | (2017.01) |
| *G06T 11/00* | (2006.01) |
| *G06F 17/30* | (2006.01) |
| *G11B 27/00* | (2006.01) |
| *H04N 21/2743* | (2011.01) |
| *H04N 21/44* | (2011.01) |
| *G11B 27/034* | (2006.01) |

(52) U.S. Cl.
CPC ............... *G06T 11/00* (2013.01); *G09G 5/00* (2013.01); *G09G 5/38* (2013.01); *G11B 27/00* (2013.01); *G11B 27/034* (2013.01); *H04N 21/235* (2013.01); *H04N 21/23418* (2013.01); *H04N 21/2743* (2013.01); *H04N 21/44008* (2013.01); *H04N 21/4788* (2013.01); *H04N 21/488* (2013.01); *H04N 21/4888* (2013.01); *H04N 21/8456* (2013.01); *G06T 2207/30241* (2013.01)

(58) Field of Classification Search
CPC ............... H04N 21/84; H04N 21/8456; H04N 21/8547; H04N 21/4788
See application file for complete search history.

(56) References Cited

U.S. PATENT DOCUMENTS

| | | | |
|---|---|---|---|
| 2011/0157370 A1* | 6/2011 | Livesey | ................. H04N 21/21 |
| | | | 348/169 |
| 2011/0181774 A1 | 7/2011 | Masuda | |
| 2012/0147053 A1 | 6/2012 | Yamamoto et al. | |
| 2012/0216121 A1* | 8/2012 | Lin | ................. H04N 21/234327 |
| | | | 715/721 |
| 2012/0269393 A1 | 10/2012 | Komoto et al. | |
| 2014/0012910 A1* | 1/2014 | White | ................ H04N 21/4788 |
| | | | 709/204 |

FOREIGN PATENT DOCUMENTS

| | | |
|---|---|---|
| JP | 2004-128614 | 4/2004 |
| JP | 2008-148071 | 6/2008 |
| JP | 2009-81592 | 4/2009 |
| JP | 2009-253342 | 10/2009 |
| JP | 2010-244437 | 10/2010 |
| JP | 2012-129749 | 7/2012 |
| JP | 4994525 | 8/2012 |
| WO | 2010/116820 | 10/2010 |
| WO | 2012/101723 | 8/2012 |

OTHER PUBLICATIONS

P. Anandan, "A Computational Framework and an Algorithm for the Measurement of Visual Motion", International Journal of Computer Vision, vol. 2, pp. 283-310, Jan. 1989.

Vladimir Kolmogorov et al., "Computing Visual Correspondence with Occlusions via Graph Cuts", International Conference on Computer Vision, 2001.

Jianbo Shi et al., "Good Features to Track", IEEE Conference on Computer Vision and Pattern Recognition, pp. 593-600, Jun. 1994.

Pedro F. Felzenszwalb et al., "Efficient Graph-Based Image Segmentation", International Journal of Computer Vision, vol. 59, No. 2, pp. 167-181, Sep. 2004.

* cited by examiner

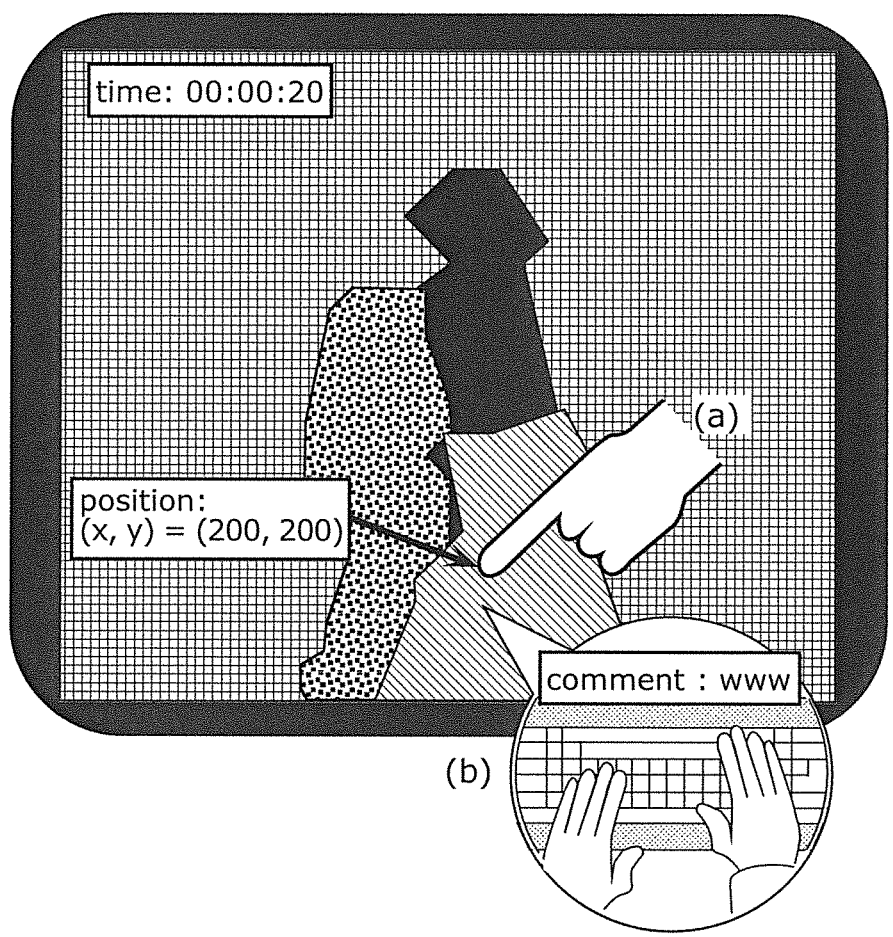

FIG. 14

| Time length (second) | Motion trajectory |
|---|---|
| 1 | (x11, y11, x12, y12, ··· x1m, y1m) |
| 1.25 | (x21, y21, x22, y22, ··· x2n, y2n) |
| 1.5 | (x31, y31, x32, y32, ··· x3r, y3r) |
| ⋮ | ⋮ |

US 9,681,201 B2

COMMENT INFORMATION GENERATING APPARATUS AND COMMENT INFORMATION GENERATING METHOD

CROSS REFERENCE TO RELATED APPLICATIONS

This is a continuation application of PCT International Application No. PCT/JP2013/004153 filed on Jul. 4, 2013, designating the United States of America, which is based on and claims priority of Japanese Patent Application No. 2012-158995 filed on Jul. 17, 2012. The entire disclosures of the above-identified applications, including the specifications, drawings and claims are incorporated herein by reference in their entirety.

FIELD

One exemplary non-limiting embodiment disclosed herein relates generally to a comment information generating apparatus and a comment information generating method for generating comment information to be superimposed and displayed on a video in such a manner that the comment tracks an object in the video.

BACKGROUND

Recent advancement in network and diffusion of mobile terminals have made it easy and common for users to enjoy communicating video content or still image content with partners at remote places. For example, there is a service for enabling users to write sentences indicating their tastes, ideas, or the like at any time points on the time axis of an already provided content item. Such communication using the content item is expected to be on the increase with development of display devices and communication techniques.

Patent Literature 1 discloses a technique for generating a video on which comments provided by users are synthesized and distributing the video through the Internet so as to realize such communication.

CITATION LIST

Patent Literature

[PTL 1]
Japanese Unexamined Patent Application Publication No. 2008-148071
[PTL 2]
Japanese Unexamined Patent Application Publication No. 2010-244437
[PTL 3]
International Publication No. 2010/116820
[PTL 4]
Japanese Unexamined Patent Application Publication No. 2004-128614
[PTL 5]
Japanese Unexamined Patent Application Publication No. 2009-81592
[PTL 6]
Japanese Unexamined Patent Application Publication No. 2003-132047
[PTL 7]
Japanese Patent Publication No. 4994525

Non Patent Literature

[NPL 1]
P. Anandan, "A Computational Framework and an Algorithm for the Measurement of Visual Motion", International Journal of Computer Vision, Vol. 2, pp. 283-310, 1989
[NPL 2]
Vladimir Kolmogorov and Ramin Zabih, "Computing Visual Correspondence with Occlusions via Graph Cuts", International Conference on Computer Vision, 2001
[NPL 3]
Jianbo Shi and Carlo Tomasi "Good Features to Track", IEEE Conference on Computer Vision and Pattern Recognition, pp. 593-600, 1994
[NPL 4]
Pedro F. Felzenszwalb and Daniel P. Huttenlocher "Efficient Graph-Based Image Segmentation", International Journal of Computer Vision, Vol. 59, No. 2, pp. 167-181, September, 2004

SUMMARY

Technical Problem

However, according to any one of conventional methods for superimposing comments on a video (or generating a video with comments), the comments are displayed at positions unrelated to the positions of objects in the video. Furthermore, the comments are displayed for a fixed display time. For this reason, it is difficult for viewers of the video to associate comments provided by comment providers with objects. In addition, it is difficult for viewers to finish reading very long comments within the fixed display time. In such cases, readability of the comments decreases.

One exemplary non-limiting embodiment provides a comment information generating apparatus and a comment information generating method for generating comment information including a comment and a motion trajectory and increasing readability of the comment when displayed.

Solution to Problem

In one general aspect, the techniques disclosed herein feature a comment information generating apparatus includes: a video obtaining unit configured to receive a video; a comment input receiving unit configured to receive inputs of position information of an object in the video received by the video obtaining unit and a comment that is displayed with the object and is caused to track the object starting from a predetermined timing; a target time determining unit configured to determine a target time during which the comment is displayed, based on the comment received by the comment input receiving unit, the target time being a target value indicating a time length; an object motion determining unit configured to determine, for the object shown by the position information, a motion trajectory having a time length that is substantially equal to the target time and along which the comment is displayed with the object and is caused to track the object; a comment information generating unit configured to generate comment information to be output including the comment and the motion trajectory of the object determined by the object motion determining unit; and an output unit configured to output the comment information generated by the comment information generating unit.

General and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiment will be apparent from the Specification and Drawings. The benefits and/or advantages may be individually obtained by the exemplary non-limiting embodiment and features of the Specification and Drawings, which need not all be provided in order to obtain one or more of such benefits and/or advantages.

Advantageous Effects

The comment information generating apparatus and a comment information generating method according to the exemplary non-limiting embodiment or features disclosed herein make it possible to generate comment information including a comment and a motion trajectory and increasing readability of the comment when displayed.

BRIEF DESCRIPTION OF DRAWINGS

These and other advantages and features will become apparent from the following description thereof taken in conjunction with the accompanying Drawings, by way of the exemplary non-limiting embodiment disclosed herein.

FIG. 7A is a diagram for explaining a procedure taken by a user to input a comment onto the frame in the video.

FIG. 7B is a diagram showing a data example of input comment information.

FIG. 14 is a diagram showing an example of a database.

DESCRIPTION OF EMBODIMENT

Figure 1:
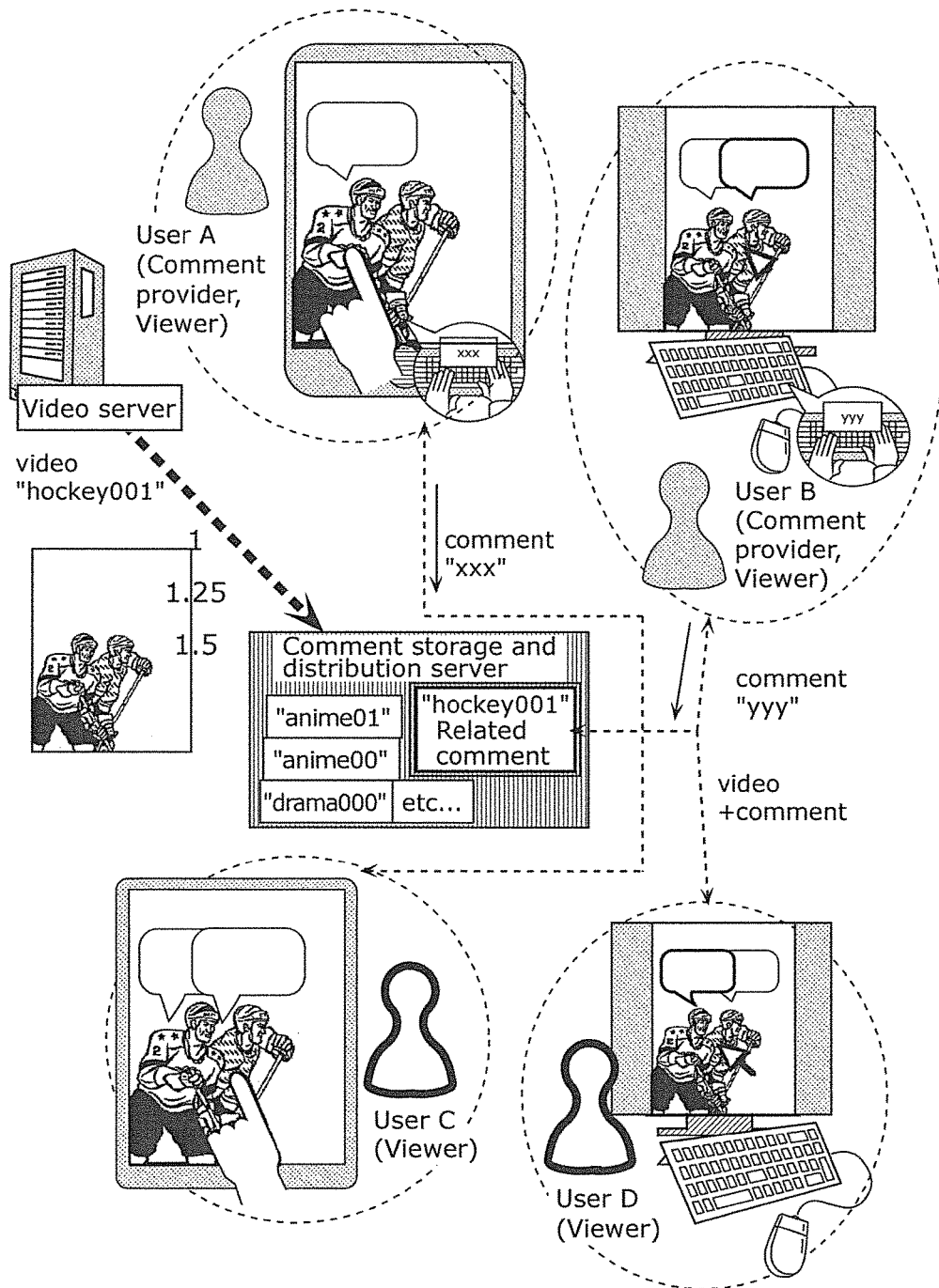
FIG. 1 is a diagram showing a configuration of a comment-provided video distributing system as a target for an embodiment.

Underlying Knowledge Forming Basis of the Present Disclosure

In relation to the conventional comment superimposing method disclosed in the "Background" section, the inventors have found the problems indicated below.

Patent Literature 1 discloses a system including a video server and a comment storage and distribution server which stores all of comments written by users through networks. In the system, comments are superimposed on the video at reproduction time points as reference points on the video and the video with the superimposed comments (hereinafter referred to as a "comment-provided video") is distributed. New comments are written by users each time the comment-provided video is distributed and reproduced. The newly written comments are associated with time points on the time axis of the video and managed in the comment storage and distribution server, and distributed basically based on the time points on the time axis of the video in the future distribution irrespective of when the comments were written. Each comment is fixedly displayed at a fixed position in the video without being associated with the object for which the comment is submitted by a user.

In addition, each of Patent Literatures 2 and 3 discloses a movie apparatus which adds character information to videos without through the Internet. Each of Patent Literatures 2 and 3 proposes an approach for displaying supplemental data in a balloon, and changing the balloon according to a motion of the object in the video, so as to easily determine the object to which a user intends to provide the supplemental data.

In addition, Patent Literature 4 discloses a chat system in which balloons are displayed. In the chat system, for a user face image synthesized at a specified position on a common background of a video, a balloon is displayed so as not to hide the user face image and any other balloon.

Patent Literature 5 discloses a technique for inputting character information or illustration information from a mobile phone or a mobile terminal to a video storage apparatus. The mobile phone or a mobile terminal includes an object tracking comment providing menu using tracking frames which can be specified by users and be moved according to motion vectors.

It is said generally that a person can visually recognize only a limited number of characters per second. In view of this, for subtitles for use in movies etc. for example, the number of characters displayed per second and the number of words displayed per minute (WPM) are defined as voluntary guidelines for providing sufficient readability of subtitles to be read.

Various approaches for inserting comments into videos have been proposed as described above. For example, a comment-provided video distribution site which uses a technique disclosed in Patent Literature 1 allows use of a limited number of characters per line extending from end to end of a display screen. For this reason, for example, a setting for scrolling and displaying a comment from end to end of the display screen for a fixed time of three seconds is applied as a default setting. On the other hand, it is difficult to determine the object to which a user actually intends to provide supplemental data.

In this disclosure, "comments which track target objects" are realized. The comments tracking the target objects have increased readability, can be easily understood by viewers in association with the target objects as actually intended by the comment providers, and thus facilitate communication between users. Here, a motion is obtained for each of the "comment which track target objects" by calculating, as a sets of coordinates of the comment tracking the object, sets of coordinates of a motion trajectory calculated by estimating a motion of the object. For example, if motion estimation for an object fails in a short time, display time for a comment is also short. In this case, there is a possibility that some users cannot finish reading the comment within the display time.

However, it is not easy to realize control of comment display time according to the number of characters in each comment.

Most of videos distributed by content providers and content items stored for personal use include a plurality of objects per scene. Particularly in the case of a video including a plurality of objects having different motions, sizes, and colors, time lengths obtained as object motion estimation results in the processes of calculating motion trajectories of the objects in the video often vary depending on the objects selected by users, parameters used in the object motion estimation.

In general, a motion is calculated by determining an object region between time-series images in an object motion estimation process. For example, an object in a given frame is assumed to be a model, an object which satisfies the model most (whose luminance difference from the model is closest to zero) in another frame is determined to be the same object, and a motion of the object between the frames is calculated from the position change of the object.

Motion estimation is impossible (motion estimation should be temporarily stopped) in some cases, for example, in the case where a target object disappears from a video. As a standard for determining that motion estimation should be temporarily stopped, the luminance difference from the model can also be used.

In the motion estimation process based on the luminance difference from the model, allowance for noises or luminance difference from the model (in other words, motion estimation accuracy) and object tracing time have a trade-off relationship. This trade-off relationship does not evenly exist in a video. Examples of frequent cases include a state where motion estimation for an object on the video is temporarily stopped before reaching a specified tracking time while motion estimation for another object in the same video is not temporarily stopped. In other words, when an even motion estimation condition is used, the estimated time until tracking ends and accuracies of the estimated motions vary depending on coordinate positions and time points on the video specified by users in the provision of the comments.

In one general aspect, the techniques disclosed herein feature a comment information generating apparatus includes: a video obtaining unit configured to receive a video; a comment input receiving unit configured to receive inputs of position information of an object in the video received by the video obtaining unit and a comment that is displayed with the object and is caused to track the object starting from a predetermined timing; a target time determining unit configured to determine a target time during which the comment is displayed, based on the comment received by the comment input receiving unit, the target time being a target value indicating a time length; an object motion determining unit configured to determine, for the object shown by the position information, a motion trajectory having a time length that is substantially equal to the target time and along which the comment is displayed with the object and is caused to track the object; a comment information generating unit configured to generate comment information to be output including the comment and the motion trajectory of the object determined by the object motion determining unit; and an output unit configured to output the comment information generated by the comment information generating unit.

With this structure, the target time during which the comment should be displayed is determined based on the comment, and the motion trajectory having the time length which is close to or substantially the same as the target time is determined.

The motion trajectory along which the comment is to be displayed represents the motion made from a starting time of the motion estimation for the object to the pause. The motion trajectory having the time length which is substantially the same as the target time length may be, in a broad sense, a motion trajectory which has a time length sufficiently close to the target time length, and in a narrow sense, a motion trajectory which has a time length equal to the target time length. Hereinafter, the target time length or duration for or during which the comment is displayed may be simply referred to as a "target time". Time difference which can be allowed as being "sufficiently close" to the target time may be different depending on a frame rate at which a video is displayed, coefficients for determining a target time, or a user. For this reason, the time difference may be determined through a test in advance, or may be selected by a user in advance. For example, ±0.25 second corresponding to a time for displaying a character is considered to be sufficiently close, and thus can be used as the time difference.

The estimated motion trajectory of the object can be used as the motion trajectory along which the comment is displayed with the object and is caused to track the object. For this reason, the user can read the comment within the display time when the comment-provided video is displayed, and determine the object to which the comment is provided.

Therefore, the comment information generating apparatus can generate comment information to be output and increasing readability of the comment.

For example, the target time determining unit may be configured to calculate the target time which lengthens as the comment received by the comment input receiving unit lengthens, and the output unit may be configured to output the motion trajectory having the time length which lengthens as the comment input to the comment input receiving unit lengthens.

In addition, the target time determining unit may be configured to calculate, as the target time, a value obtained by multiplying a unit display time which is a predetermined display time per character and the number of characters in the comment received by the comment input receiving unit, and the output unit may be configured to output the motion trajectory having, as the time length, the value obtained by multiplying the unit display time and the number of characters, when the comment is input to the comment input receiving unit.

In addition, the target time determining unit may be further configured to calculate, as the target time, a predetermined visual recognition time required to visually recognize the characters, when the calculated target time is shorter than the predetermined visual recognition time, and the output unit may be configured to output, as the motion trajectory, a motion trajectory which has a time length larger than or equal to the visual recognition time even if the comment is shorter than the visual recognition time, by outputting the motion trajectory which corresponds to a longer one of the visual recognition time and a value obtained by multiplying a unit display time which is a predetermined display time per character and the number of characters in the comment when the comment is input to the comment input receiving unit.

Here, visual recognition time is minimum time required to recognize some characters.

In addition, the output unit may be configured to output a plurality of the motion trajectories which are different from each other for a plurality of the comments received by the comment input receiving unit, when the plurality of the comments have different numbers of characters and are provided at a same position in a same frame.

In addition, the object motion determining unit may be configured to calculate a plurality of the motion trajectories for the object which is in the video and shown by the position information received by the comment input receiving unit, using a plurality of motion estimation methods or motion estimation parameters, and may determine, for the object, the motion trajectory which is selected as having a time length closest to the target time from among the plurality of the motion trajectories calculated for the object.

With this structure, it is easy to estimate the motion trajectory which lasts for the target time by calculating the motion trajectory using the plurality of motion estimation methods and the plurality of motion estimation parameters.

For example, the object motion determining unit may be configured to calculate a plurality of the motion trajectories for the object which is in the video and shown by the position information received by the comment input receiving unit, using, as the plurality of motion estimation parameters, one kind of (i) allowance parameters having different values which affect trackability of the object, (ii) search window regions having different sizes, and (iii) feature values having different values, and determine, for the object, the motion trajectory which is selected as having a time length closest to the target time from among the plurality of the motion trajectories calculated for the object.

A large allowance for difference yields a long motion trajectory and a reduced motion estimation accuracy. A small allowance for difference yields an increased motion estimation accuracy and a short motion trajectory. A small search window region size yields a long motion trajectory and a reduced motion estimation accuracy. A large search window region size yields an increased motion estimation accuracy and a short motion trajectory. A small number of feature values yields a long motion trajectory and a reduced motion estimation accuracy. A large number of feature values yields an increased motion estimation accuracy and a short motion trajectory.

In addition, in a case of occurrence of a "motion estimation impossible state" in which the motion trajectory closest to the target time cannot be determined for the object using the plurality of motion estimation methods or motion estimation parameters, the object motion determining unit may be further configured to determine whether the "motion estimation impossible state" is caused by occlusion or a scene change, and switch between object motion determining methods based on a result of the determination.

In addition, when determining that the "motion estimation impossible state" is caused by the occlusion, the object motion determining unit may be configured to determine the motion trajectory having the time length closest to the target time for the object by extrapolating a motion trajectory of the object from a frame at which the occlusion occurred to a following frame, based on a motion trajectory of the object to the frame at which the occlusion occurred.

With this structure, it is possible to extrapolate the motion trajectory between the frames with occlusion, based on the motion trajectory between the frames without occlusion.

In addition, when determining that the "motion estimation impossible state" is caused by the scene change, the object motion determining unit may be configured to determine, for the object, a motion trajectory to a frame at which the scene change occurred as the motion trajectory to be output.

When a scene change occurred, it is very difficult to accurately calculate the motion trajectory of the object across the scene change. Thus, there is a high possibility that an inaccurate motion trajectory is calculated after the scene change. Accordingly, in many cases, it is better not to estimate the motion trajectory after the scene change, so that a better readability of the comment is obtained.

In addition, the object motion determining unit may be configured to determine that the "motion estimation impossible state" is caused by the scene change, when a difference between luminance histograms of frames composing the video is larger than or equal to a predetermined threshold value, and that the "motion estimation impossible state" is caused by the occlusion, when a difference between the luminance histograms of the frames composing the video is smaller than the predetermined threshold value.

In addition, when a motion trajectory among the plurality of the motion trajectories of the object calculated using the plurality of motion estimation methods or motion estimation parameters is shorter than the time length corresponding to the target time by a predetermined time or more, the object motion determining unit may be configured to determine, as the motion trajectory, a motion trajectory which is closest to the target time by connecting, to a forward end of a motion trajectory of the object, a motion trajectory which is estimated between (i) the frame having the position information and the input comment received by the comment input receiving unit and including a position which is shown by the position information received by the comment input receiving unit and (ii) a frame positioned backward on a time axis.

With this structure, when the time of the motion trajectory of the object shown in the position information does not reach the target time, it is possible to determine the motion trajectory whose time is closest to the target time, based on the result of tracking the object in any one of the frame regions and the corresponding frame region.

In addition, when a motion trajectory among the plurality of the motion trajectories of the object calculated using the plurality of motion estimation methods or motion estimation parameters is shorter than the time length corresponding to the target time by a predetermined time or more, the object motion determining unit may be configured to determine a motion trajectory having a time length closest to the target time as the motion trajectory of the object shown by the position information received by the comment input receiving unit from among the plurality of the motion trajectories calculated for the object starting at positions within a predetermined distance range from positions shown by the position information of the object received by the comment input receiving unit.

In addition, when a motion trajectory among the plurality of the motion trajectories of the object calculated using the plurality of motion estimation methods or motion estimation parameters is shorter than the time length corresponding to the target time by a predetermined time or more, the object motion determining unit may be configured to determine a motion trajectory having a time length closest to the target time as the motion trajectory of the object shown by the position information received by the comment input receiving unit from among the plurality of the motion trajectories calculated for the object based on positions within a user-specified range including positions shown by the position information of the object received by the comment input receiving unit.

With this structure, when the time of the motion trajectory of the object shown in the position information is shorter than the target time by the certain time, it is possible to estimate the motion trajectory which lasts for the target time, based on the result of tracking the object using the closest motion trajectory starting at a point near the shorter motion trajectory. Here, the same process may be performed not only at spatially close coordinates but also at close coordinates in the time direction.

In addition, when a motion trajectory among the plurality of the motion trajectories of the object calculated using the plurality of motion estimation methods or motion estimation parameters is shorter than the time length corresponding to the target time by a predetermined time or more, the object motion determining unit may be configured to divide the object into regions, and determine a motion trajectory having a time length closest to the target time as the motion trajectory of the object, the determined motion trajectory ending in one of the regions.

With this structure, when the motion trajectory of the object shown by the position information is shorter than the target time by the certain time, it is possible to determine the motion trajectory of the object which satisfies the target time by using the closest motion trajectory starting at a point near the shorter motion trajectory.

In addition, the object motion determining unit may be further configured to determine, as the motion trajectory, a motion trajectory having a time length closest to the target time, modify the determined motion trajectory for the object to be a virtual motion trajectory from a position at which a comment received by the comment input receiving unit is provided, based on a relative position relationship between the position at which the comment is provided and a center of gravity of the object shown by the position information received by the comment input receiving unit, and output the modified motion trajectory.

With this structure, for example, it is possible to modify the motion trajectory of the object into a modified motion trajectory that maintains the relative position relationship between the barycentric coordinates of the object and the coordinates of the comment specified by the position information in the frame.

Here, when the time length of the motion trajectory of the object calculated using the plurality of motion estimation methods and the plurality of the motion estimation parameters is longer than the target time by the certain time, the object motion determining unit can determine, as the motion trajectory of the object shown by the position information received by the comment input receiving unit, only the motion trajectory having the time length within the range from the time point in the starting frame to the target time, for the motion trajectory having the highest accuracy and the shortest time length.

In addition, the above-described comment information generating apparatus may further include a target time adjusting unit configured to adjust the target time by lengthening the target time with an increase in a motion velocity of the object, based on the motion trajectory of the object determined by the object motion determining unit, wherein the object motion determining unit may be further configured to determine, for the object, a new motion trajectory having a time length corresponding to the target time adjusted by the target time adjusting unit, the new motion trajectory being for displaying the comment with the object shown by the position information and causing the comment to track the object.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, an exemplary non-limiting embodiment is described in detail with reference to the accompanying Drawings.

The exemplary embodiment described below shows a general or specific example. The numerical values, shapes, materials, components, the arrangement and connection of the components, steps, the processing order of the steps etc. shown in the following exemplary embodiment are mere examples, and therefore do not limit the scope of the appended Claims and their equivalents. Therefore, among the components in the following exemplary embodiment, components not recited in any one of the independent claims are described as arbitrary components.

FIG. 1 shows a configuration of a comment-provided video distributing system as a target for an embodiment. As in Patent Literature 1, the comment-provided video distributing system includes a video server and a comment storage and distribution server. Both of the servers may be managed on a same personal computer (PC), or may be managed on different PCs.

Different users A to D shown in FIG. 1 browse a video distributed to terminals (smart phones, PCs, tablet PCs, or the like) of their own via networks. In this example shown in FIG. 1, each of users A and B provides a comment onto the video through keyboards, software keyboards, or the like of their terminals. The comment here is character information provided in association with user-specified information that is temporal position (that is an example time or a frame number) in the video and spatial position (that is a set of coordinates). Here, the term "video" referred to in the descriptions below may be a video or a video data.

The comment provided by the user is stored in the comment storage and distribution server as necessary together with information such as a video to which the video is provided, user ID of the user, a time point and coordinates (in the video) with which the comment is associated, a real time point at which the comment is submitted. In the case where users C and D view the video after the users A and B provide comments in the video, the comments of the users A and B are distributed from the comment storage and distribution server together with other comments associated with the video. The comments are synthesized onto the video based on the information (the time points after elapse of time in the video, coordinates, etc.) associated to the comments, and the video with the synthesized comments is displayed.

Figure 2A:
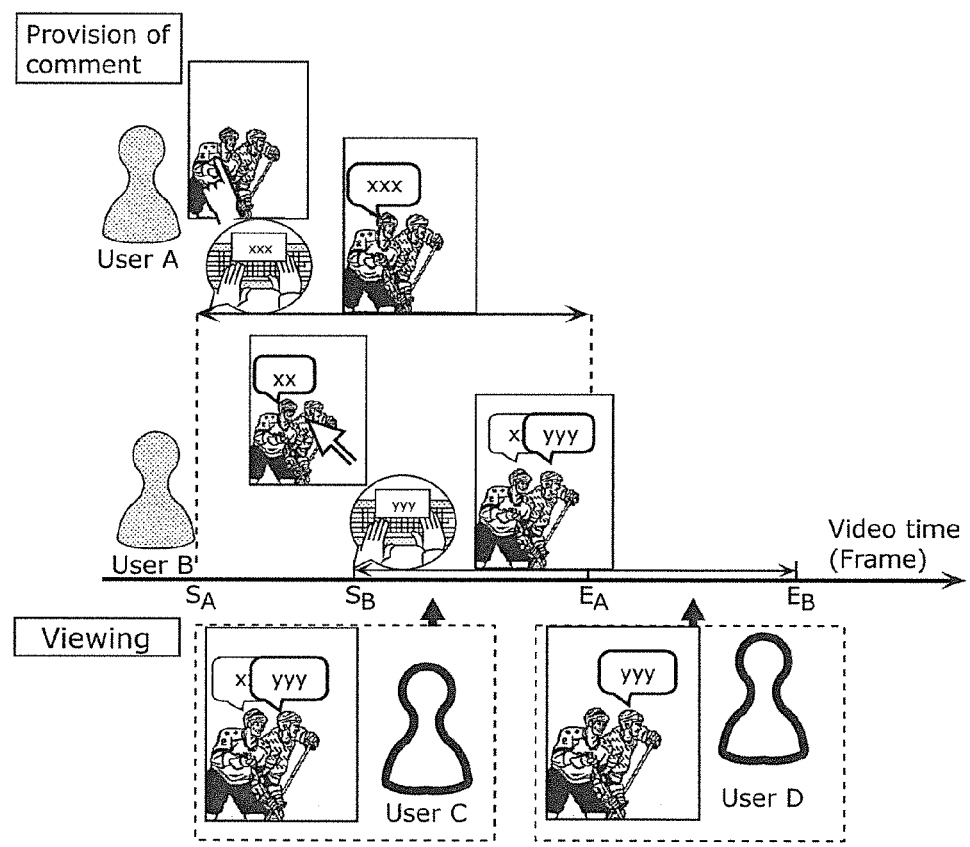
FIG. 2A is a diagram showing a time flow of provision of comments to a video.
Figure 2B:
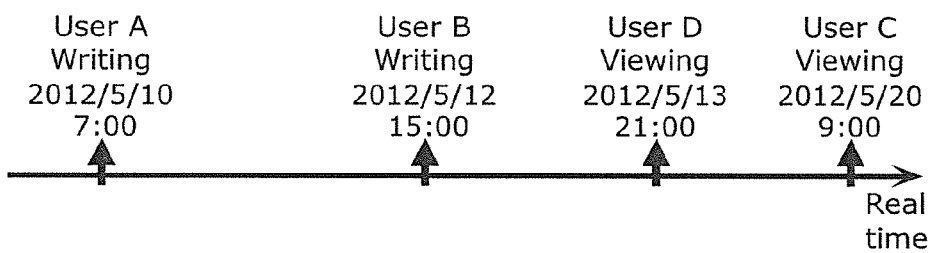
FIG. 2B is a diagram showing a time flow of provision of the comments to the video and viewing of the video.

Each of FIGS. 2A and 2B shows a e flow of providing comments onto the video.

First, FIG. 2A shows a flow of time in the video and relationships with the comments to be displayed. The comments are stored in the server in association with the time points (reproduction time points) in the video (these time points are referred to as video time hereinafter). For example, each comment is displayed for a time length sufficient for visual recognition of the comment. How to calculate such a time length is described in detail later.

With reference to FIG. 2A, the comment of the user A is displayed for SA second to EA second in the video time, and the comment of the user B is displayed for SB second to EB second in the video time (each of the time lengths may be calculated using the number of frames instead of using seconds). Although "second" is used as a unit of time, "the number of frames" may be used instead of "second".

In addition, FIG. 2B shows a real time flow in the form of date and time. FIG. 2B shows the case where the users C and D view the video with comments after the users A and B provide (write) the comments in the video. In the case where the user C is viewing a video part which corresponds to SB second to EA second in the video time, the user C can view the comment-provided video on which the comment of the user B is superimposed onto the comment of the user A as shown in FIG. 2A. On the other hand, it is assumed that the user D views the video for EA second to EB second in the video time. The user D can view the video on which only the comment of the user B is provided as shown in FIG. 2A.

The concept of the comment-provided video in this embodiment has been described above.

Figure 3:
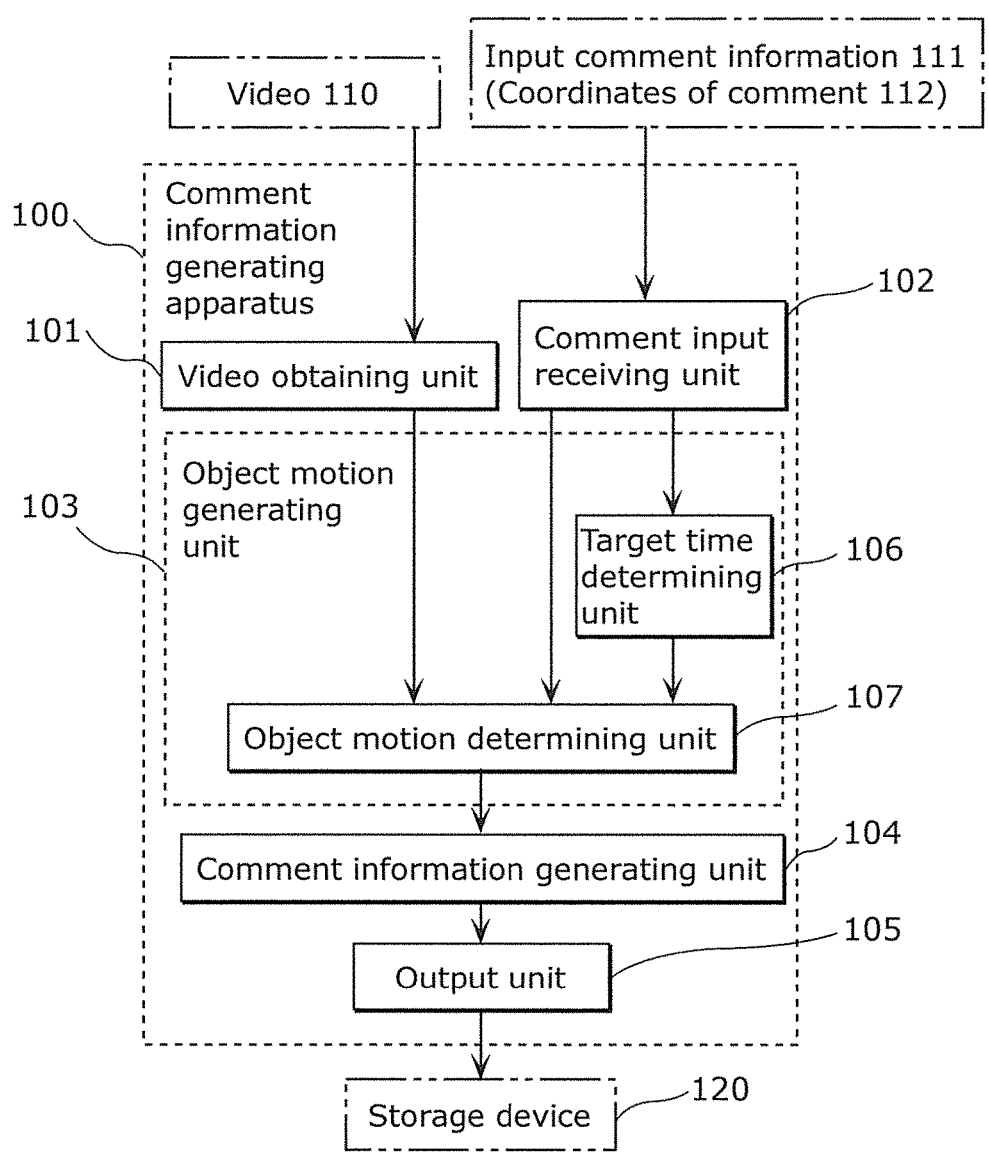
FIG. 3 is a block diagram showing a functional structure of a comment information generating apparatus according to the embodiment.

FIG. 3 is a block diagram showing a functional structure of a comment information generating apparatus 100 according to this embodiment. As shown in FIG. 3, the comment information generating apparatus 100 includes a video obtaining unit 101, a comment input receiving unit 102, an object motion generating unit 103, a comment information generating unit 104, and output unit 105.

The comment information generating apparatus 100 receives a video 110 and input comment information 111 indicating details of a comment (and including comment coordinates 112 which are the coordinate values of the comment on the video), calculates a motion between pixels or of a subject specified by a user on the video 110, from the comment coordinates 112, generates comment information (an object tracking comment) to be output, and output it to a storage unit 120.

The video obtaining unit 101 receives a video or a plurality of pictures (also referred to as "images" or "frames") composing a video. The video obtaining unit 101 may be, for example, an interface which reads out a video stored in a storage device such as a video server directly or via a communication path.

The comment input receiving unit 102 receives the input comment information 111 (comment coordinates 112) input by the user. The comment input receiving unit 102 may be, for example, an interface which reads out time points or coordinates specified by the user on the video through clicks, touches on a touch panel, or the like directly or via a communication path.

The object motion generating unit 103 estimates an object motion depending on a length of character strings and readability of each comment, based on the video 110 received by the video obtaining unit 11 and the input comment information 111 (including the comment coordinates 112) received by the comment input receiving unit 102.

The comment information generating unit 104 generates comment information to be output, from the input comment information 111 and the object motion (a motion trajectory composed of sequential sets of coordinate values along a time axis for display of tracking comments) generated by the object motion generating unit 103.

The output unit 105 outputs the comment information generated by the comment information generating unit 104 to the storage device 120 wired or wirelessly. Here, the output comment information includes comment character information provided to the video, coordinates of the comment, comment submission time, comment-related information such as comment display time. Furthermore, the output comment information may include a shape or a size of comments to be displayed.

The object motion generating unit 103 includes a target time determining unit 106, and an object motion determining unit 107.

The target time determining unit 106 determines target time during which the comment is displayed with the object and is caused to track the object, in other words, target time sufficient for displaying the comment included in the input comment information 111 received by the comment input receiving unit 102, based on the input comment information 111. The target time can be determined, for example, based on the number of characters of the comment.

The object motion determining unit 107 determines an object motion having a length sufficiently close to and larger than the target time, and does not reduce estimation accuracy more than required, from among a plurality of motion estimation methods and a plurality of motion estimation parameters, based on the video 110 received by the video obtaining unit 101, the input comment information 111 (including the comment coordinates 112) received by the comment input receiving unit 102, and the target time determined by the target time determining unit 106. The object motion determining unit 107 selects one of the motion estimation methods or one of the motion estimation parameters which yields, as a result of tracking the object from the comment coordinates 112, the object motion having a length sufficiently close to and larger than the target time, and determines a motion (motion trajectory) between pixels (of the object) from the specified comment coordinates 112.

Here, each of the components (the video obtaining unit 101, the comment input receiving unit 102, the object motion generating unit 103, the comment information generating unit 104, and the output unit 105) of the comment information generating apparatus 100 may be realized as software such as a program or the like which is executed on a computer, or as hardware such as an electric circuit and an integrated circuit. Each of FIGS. 4A and 4B is a diagram showing a hardware structure of the comment information generating apparatus configured with a computer according to this embodiment.

Figure 4A:
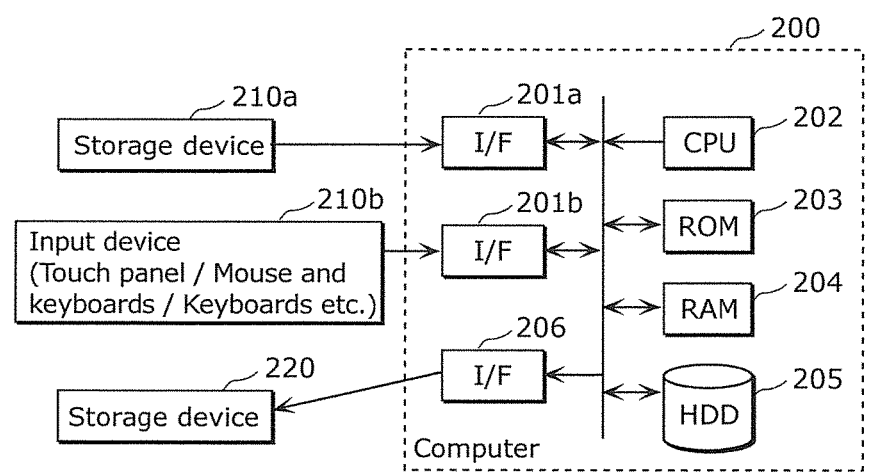
FIG. 4A is a diagram showing a hardware structure of the comment information generating apparatus configured with a computer.
Figure 4B:
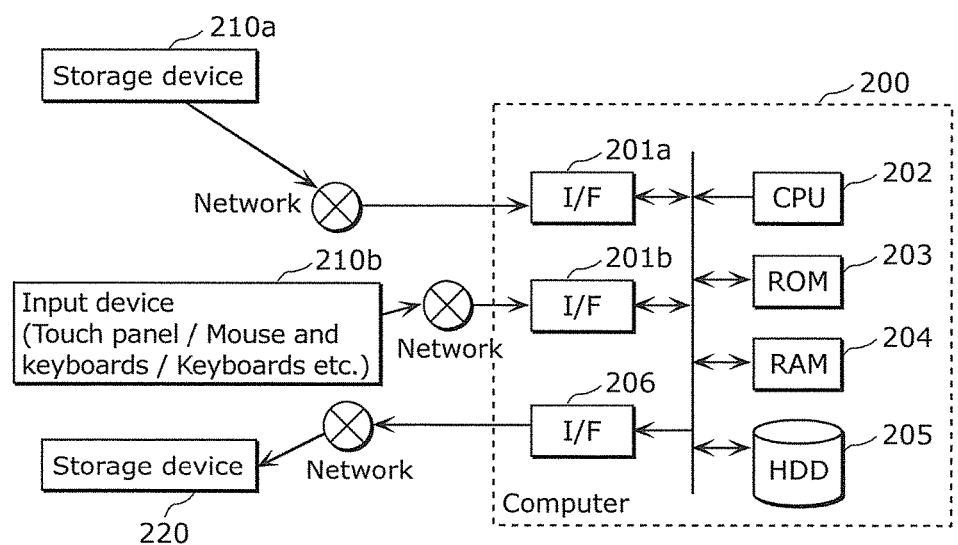
FIG. 4B is a diagram showing the hardware structure of the comment information generating apparatus configured with the computer.

In each of FIGS. 4A and 4B, the storage device 210a outputs the stored video 110 through an I/F (interface) 201a. An input device 210b which receives an input from the user outputs the input comment information 111 through an interface (I/F) 201b. A computer 200 obtains the video 110 and the input comment information 111, generates the object tracking comment, and generates the comment information of the object tracking comment.

A storage device 220 obtains and stores the comment information generated by the computer 200.

The computer 200 includes the interfaces 201a and 201b, a CPU 202, a ROM 203, a RAM 204, an HDD 205, and an interface 206. A program for causing the computer 200 to operate is stored in the ROM 203 or the HDD 205 in advance. The program is read out from the ROM 203 or the HDD 205 to the RAM 204 and is unwound therein by the CPU 202 which is a processor. The CPU 202 executes each of the instruction codes in the program unwound in the RAM 204. Through each of the interfaces 201a and 201b, the video 110 and the input comment information 111 are read to the RAM 204 according to execution of the program. Through the interface 206, the comment information for the object tracking comment generated by the execution of the program is output and stored in the storage device 220.

Here, the computer program is not limited to the ROM 203 or the HDD 205 which is a semiconductor, and may be stored in a CD-ROM or the like. Alternatively, the computer program may be transmitted through a wired or wireless network or broadcasting, and be read onto the RAM of the computer.

Figure 5:
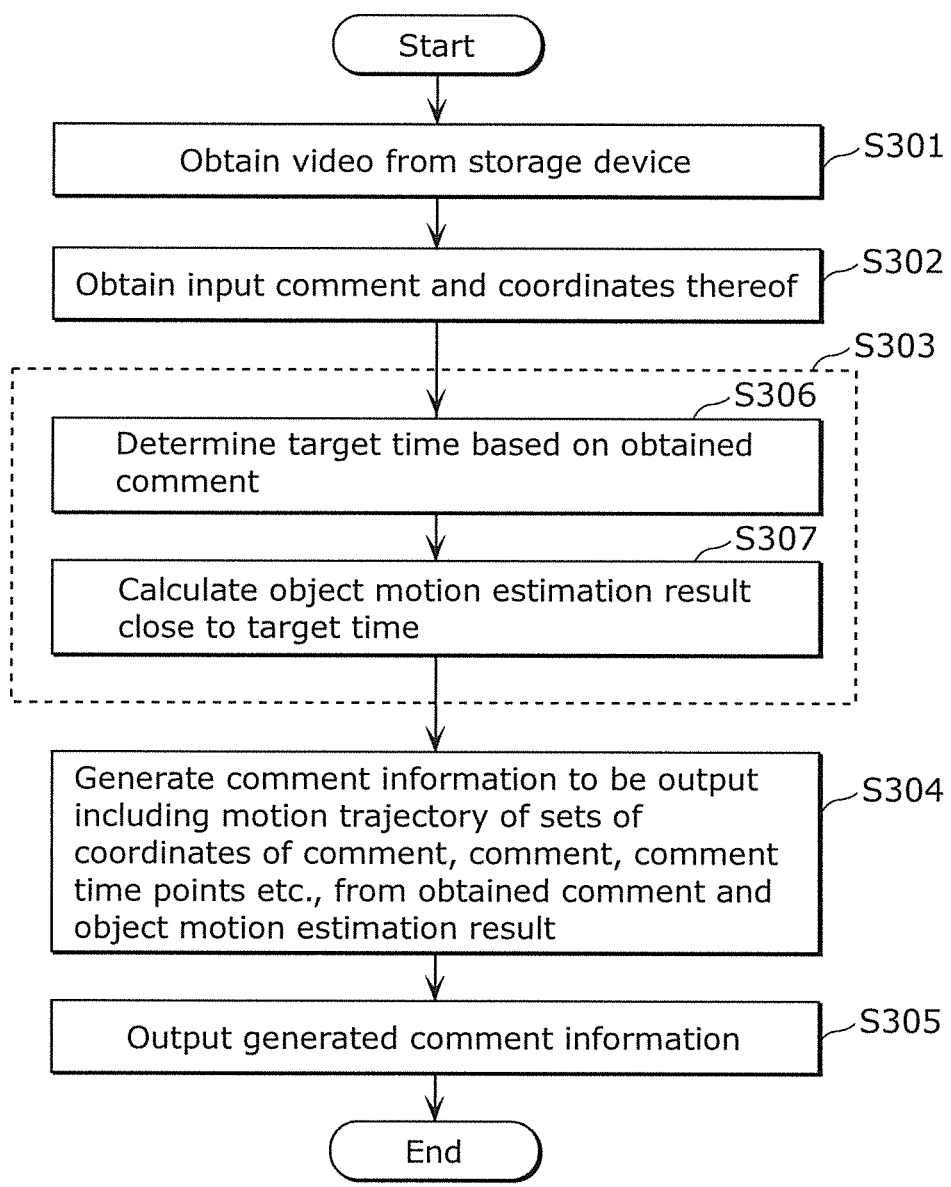
FIG. 5 is a flowchart of an operation procedure taken by the comment information generating apparatus.

Operations performed by the comment information generating apparatus 100 in this embodiment are described below with reference to FIG. 5. FIG. 5 is a flowchart showing operations performed by the comment information generating apparatus 100 in this embodiment.

In FIG. 5, seven steps S301 to S307 correspond respectively to processing units 101 to 107 in FIG. 3. These operations are as follows: a video obtaining step S301 performed by the video obtaining unit 101; a comment input receiving step S302 in the comment input receiving unit 102; an object motion generating step S303 in the object motion generating unit 103; a comment information generating step S304 in the comment information generating unit 104; and an output step S305 in the output unit 105. In addition, the object motion generating step S303 includes two steps of a target time generating step S306 and an object motion estimating step S307. The target time generating unit 106 executes an operation in the target time generating step S306, and the object motion determining unit 107 executes an object motion estimating step S307.

First, the video obtaining step S301 is executed by the video obtaining unit 101. The video obtaining unit 101 obtains the video 110.

In this embodiment, it is assumed that videos 110 which are obtained by the video obtaining unit 101 are broadcast videos, various kinds of videos or the like captured by users, or pluralities of pictures (images) composing videos. These videos 110 are stored in a video server or the like. The video obtaining unit 101 obtains a video 110 through a wired or wireless network, broadcasting, or the like. In this embodiment, the video has 30 frames per second.

Figure 6A:
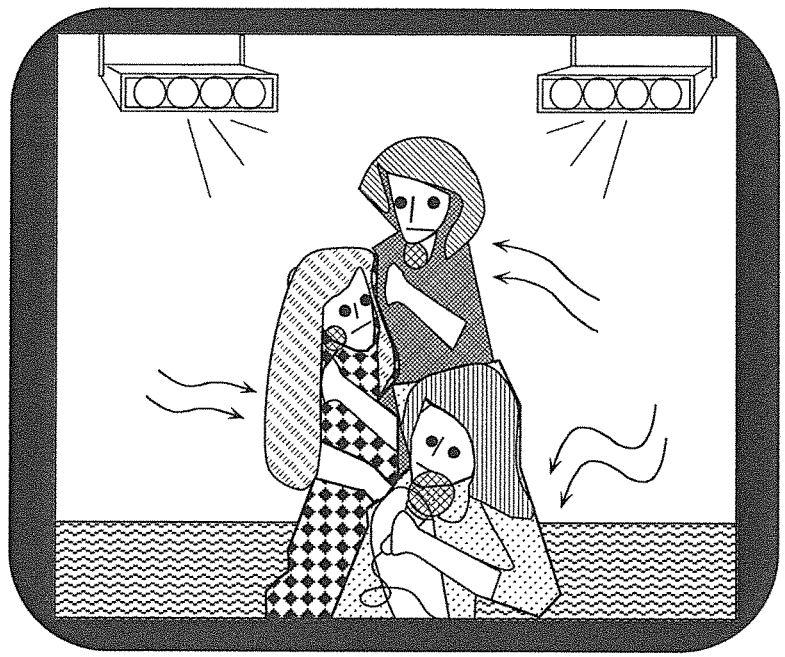
FIG. 6A is a diagram showing an example of a frame in a video.
Figure 6B:
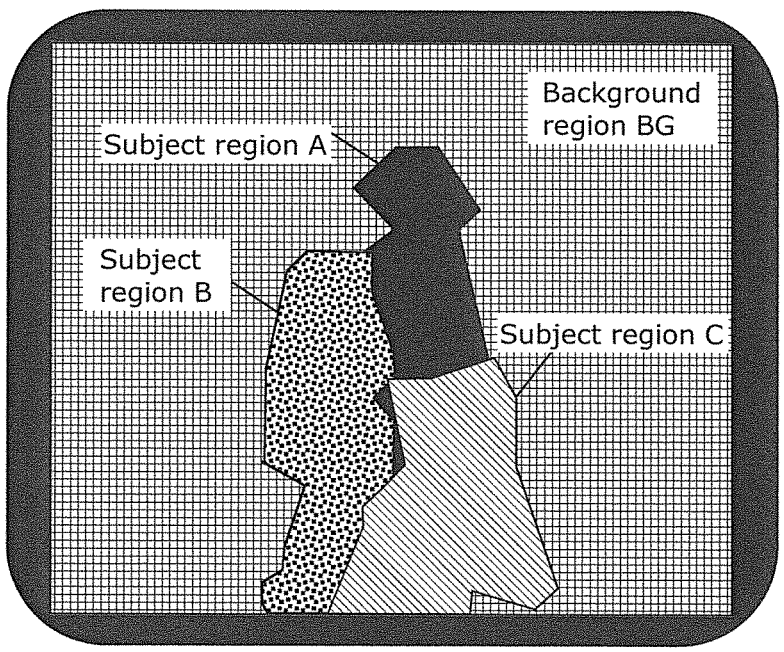
FIG. 6B is a diagram showing subject regions in the frame in the video.

FIG. 6A shows an example of a video to be obtained. The example here shows a music-related video content item. However, videos to be targets are not limited to those disclosed here. Here, for simplification in the descriptions and drawings, FIG. 6B shows the example of the video in which subject regions are displayed in a simplified manner.

With reference to FIG. 5, the comment input receiving step S302 is executed by the comment input receiving unit 102. The comment input receiving unit 102 obtains the input comment information 111. FIG. 7A shows an example of how a user inputs a comment, and FIG. 7B shows an example of the input comment information 111 which is obtained.

As shown in FIG. 7B, the input comment information 111 includes at least three information items which are comment time (time), comment target coordinates (position), and a comment character string (comment) which is input sentence information. The comment time is time showing elapsed time (reproduction time) in the video 110, and may be any other information such as a frame number that can identify, instead of the time information, a timing at which the comment is provided in the video 110 by the user. The comment target coordinates may be any other information such as coordinate values which are normalized to have 1 as an aspect ratio of the display screen, as long as the information makes it possible to identify a spatial position at which the comment is provided in the frame by the user.

Here, the comment may be input through a user interface on a device such as a PC or a mobile terminal including the comment information generating apparatus 100. Alternatively, the comment may be input by receiving via a communication line a comment and position information of the object to be displayed with the comment, through an operation using a user interface on a device such as a general PC or mobile terminal which does not include the comment information generating apparatus 100.

The information included in the input comment information 111 may be only two information items which are the comment time (time) and a comment character string (comment) which is input sentence information, and comment target coordinates (position) may be estimated by an additionally provided position estimating unit.

It is conceived that each comment displayed on a frame has a feature of the object as a comment target. In other words, a comment sentence in the frame is related to the position information of the comment. Accordingly, it is possible to estimate comment target coordinates of a comment which is to be newly provided in the frame from coordinates of a comment already provided in the frame and similar to the new comment, among the comments stored so far.

In addition, for example, in the case where a user input by a mouse, a key, or a touch for submitting a comment is detected by a terminal in use for browsing while a video 110 is being reproduced on the terminal, the reproduction of the video 110 is automatically temporarily stopped, and then the comment is submitted. Alternatively, the reproduction of the video 110 is temporarily stopped by a user operation on the display screen, and then the comment is submitted.

For example, on the display screen shown in FIG. 7A, the user specifies coordinates on the display screen in a state where the reproduction of the video 110 is temporarily stopped (for operability) ((a) of FIG. 7A). In response to this specification, a pop-up screen is superimposed and displayed on the comment information generating apparatus 100 ((b) of FIG. 7A). The user submits the comment by inputting the comment in the pop-up screen. Here, the coordinate on the display screen are specified by, for example, clicking a mouse with a mouse pointer placed on the coordinates at which the comment is provided by the user on a PC display screen or directly touching the display screen of a touch panel display. When the position estimating unit is additionally provided, the user does not need to specify the position of the user. Thus, there is no problem in usability if the video is not temporarily stopped for comment input.

Alternatively, a comment may be submitted by voice input. In this case, it is good to provide a voice analyzing unit which converts an input voice into a comment sentence. Here, such an input voice is normally a spoken expression which is strictly different from a written expression. For this reason, for example, the voice analyzing unit converts the input voice into the comment sentence as a written expression. For example, Patent Literature 6 discloses a method for converting a spoken expression input in the form of a voice into a written expression. The spoken-expression data is converted into the written expression by performing morpheme analysis thereon, obtaining candidate written expressions from a table in which spoken expressions and written expressions are associated with each other, and selecting a frequently-appearing word order and expressions from the written expression database. This mechanism makes it possible to convert a unique spoken expression and homophenes into comment sentences as appropriate written expressions.

With reference to FIG. 5, the object motion generating unit 103 executes the object motion generating step S303.

The target time determining unit 106 executes the target time determining step S306 based on the input comment information 111 received in the comment input receiving step S302, and determines the target time. Next, based on the target time determined by the target time determining unit 106, the video 110 obtained in the video obtaining step S301, and the input comment information 111 received in the comment input receiving step S302, the object motion determining unit 107 executes the object motion determining step S307, and determines a motion trajectory composed of coordinate values along the time axis for displaying a tracking comment. These processes are described in detail below, The target time determining unit 106 determines target time required for a user who is a comment provider or another user to visually recognize the input comment.

In an exemplary case of subtitles for use in movies etc., one of guidelines specifies that an English sentence should "display 12 characters per second". In addition, target time may be calculated based on a unit of words. For example, a words per minute (WPM, the number of words which can be read per 1 minute) is used as a unit indicating a sentence reading speed. It is said that an adult native American normally reads a magazine, a newspaper, or a book at 250 to 300 WPM. Thus, this standard can be applied to calculate the target time.

For example, when a comparatively slow 200 WPM or the like is set as a target readability, it is possible to calculate the number of words W by detecting the space in the input comment sentence. For this reason, the target time Nw (second) can be calculated according to "Target time Nw=W*60/200".

It is said that approximately 0.5 second is required for a person to visually recognize something. This time is referred to as visual recognition time. In consideration to the visual recognition time, the target time is calculated as time having a predetermined length (for example, 0.5 second) or larger.

In addition, when a user inputs a comment in a frame in which another comment is already displayed, it is good to calculate a comparatively long target time for the comment to be input newly so that the user can visually recognize both of the displayed past comment character information and the newly input comment sentence information. It is also good to calculate target time by adding the number of characters or words of the new comment to the predetermined number of characters or words. In this way, the user who browses the comment-provided video can visually recognize the comment sentences displayed at the same time in a more reliable manner.

In addition, when a comment composed on the same character string is already provided on the frame to which the user is trying to provide a comment, the redundancy produced by the overlap of comment details may provide a sense of discomfort. In view of this, as the number of the comments having the same details on the same frame increases, the target time may be set to be short to zero for a new comment having the same details. To reduce the target time, for example, it is possible to modify the target time calculated from the number of characters to a value obtained by dividing the target time by the number of the same comments. Likewise, even when the same comment is not provided to the same frame, the target time may be set to be short or zero for a comment which appears several times in the same video.

In the non-limiting example, the target time determining unit 106 estimates target time as necessary from the number of characters of the input comment. However, the target time determining unit 106 may operate differently. As one of different examples, it is good to calculate relationships between the numbers of characters of comments and target time, and store them as a database or an association table in a storage device included in the comment information generating apparatus or provided outside of the same. The target time determining unit 106 may obtain the target time with reference to the database or the association table wired or wirelessly instead of estimating the target time from the number of characters of a comment received as an input. By estimating target time lengths in advance, it is possible to determine a target time for an input comment at a higher speed.

Here, the object motion generating unit 103, the comment information generating unit 104, and the output unit 105 may be provided at each terminal side with which the comment-provided video is viewed.

Nowadays, functions for automatic translation between different languages are common. Accordingly, it is possible to view a video with comments translated from comments originally provided to the video in a different language. In such a case, for example, each viewer-side terminal may select a translation target language. In a simplest manner, each viewer-side terminal translates a comment into a comment in a target language based on language information stored in the terminal, and the translated comment may be subject to operations performed by the object motion generating unit 103, the comment information generating unit 104, and the output unit 105.

Alternatively, it is also good that the object motion generating unit 103, the comment information generating unit 104, and the output unit 105 are provided to a server which translates comments on a video into a specific language and distributes the video with the translated comments to a region in which the language is spoken, and perform the same operations.

Next, the object motion determining unit 107 determines a motion trajectory composed of coordinate values along the time axis for displaying the tracking comments, based on the target time determined by the target time determining unit 106, the input comment information, and the video 110.

More specifically, the object motion determining unit 107 receives a plurality of pictures from the video obtaining unit 101, detects corresponding points between pictures, and generates and outputs a motion trajectory. The motion trajectory here is obtained by detecting a motion between pixel blocks of temporally adjacent two pictures composing the video 110 and connecting coordinate values representing the motions along the time axis.

Figure 8A:
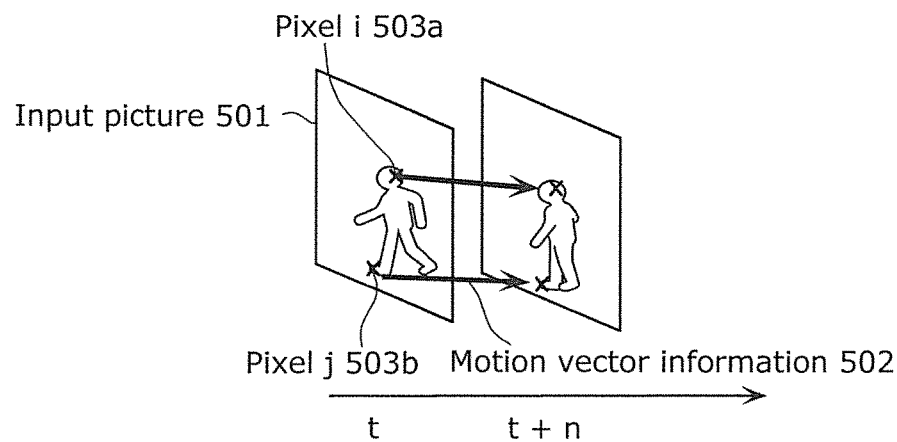
FIG. 8A is a diagram for explaining a motion trajectory calculating method performed by an object motion determining unit.

As shown in FIG. 8A, the object motion determining unit 107 tracks a motion between a pixel i 503a and a pixel j 503b of an input picture 501 at a time t using motion vector information 502 calculated between the two pictures, and calculates corresponding points of the pixel i 503a and the pixel j 503b. At this time, according to Expression 1, the object motion determining unit 107 calculates a motion trajectory $x^i$ from pixel coordinate values $(X_1^i, Y_1^i)$ of the pixel i on a frame 1 among the pictures and pixel coordinate values $(X_t^i, Y_t^i)$ of the pixel i which are the corresponding points at the time t.

$$x^i = (x_1^i, y_1^i, \ldots, x_t^i, y_t^i, \ldots, x_T^i, y_T^i)$$ [Math. 1]

In this embodiment, the motion trajectory $x^i$ is composed of corresponding points between T pictures from a frame 1 to a frame T.

Figure 8B:
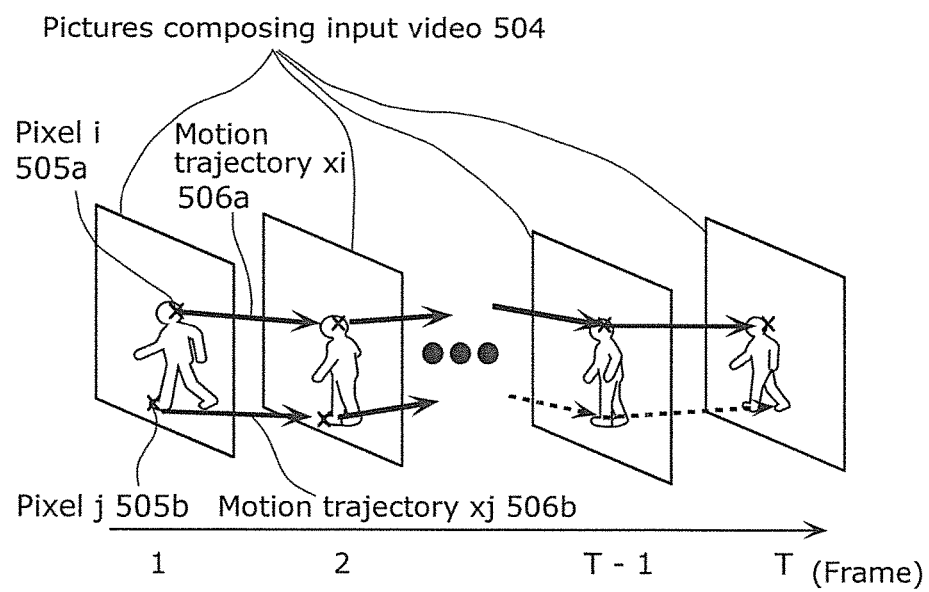
FIG. 8B is a diagram for explaining a motion trajectory calculating method performed by the object motion determining unit.

FIG. 8B shows examples of motion trajectories. The video 110 input to the object motion determining unit 107 is composed of T pictures 504. At this time, each of the motion trajectories $x^i$ 506a and $x^j$ 506b is a group of corresponding points of the pixel i 505a and the pixel j 505b of pictures from a frame 2 to the frame T. Each of the motion trajectories $x^i$ 506a and $x^j$ 506b is presented as a vector having as elements the picture coordinates values in each picture. Here, based on all of the pixels (the number of pixels is I) on the frame 1 among the pictures, corresponding pixels on (T−1) pictures from the frame 2 to the frame T are calculated.

When calculating the corresponding points between the pictures, the object motion determining unit 107 may calculate a corresponding point for each of corresponding pixels (blocks) in the pictures, instead of calculating a corresponding point for each of all the pixels of the pictures. In this embodiment, pixel-based processing is described. However, pixel block (region)-based processing may be performed in the same manner by (i) summing pixel values in a block, (ii) averaging pixel values in the block, or (iii) calculating a median value of pixel values in the block, so as to calculate data (representative values) corresponding to the block, and using the obtained representative value. In this embodiment, whether a corresponding point is calculated for a pixel or calculated for a plurality of pixels is not discriminated. In addition, each of a distance between a pixel i of a picture and a corresponding point in another picture and a distance between a block i in a picture and a corresponding point in another picture is referred to as a motion trajectory of the pixel i. In this embodiment, the motion trajectory calculated according to the above-described motion estimation procedure is a basic motion for an object tracking comment. In addition, when calculating the corresponding point between pictures, frames are not necessarily consecutive. For example, it is also good to calculate a motion trajectory from two pictures input at a time t and a time t+n. Here, n is an integer of 1 or larger.

As a specific approach for calculating a corresponding point between pictures, it is also good to use one of methods disclosed in Non-patent Literature 1 and Non-patent Literature 2. Each of the methods is an approach for calculating a motion vector by calculating an optical flow. In Non-patent Literature 1, an optical flow is calculated based on hierarchical block matching. Smoothness between pixels is a constraint condition, and thus motion vectors smoothly change between adjacent optical flows. Particularly when there is no abrupt motion or occlusion, an efficient and accurate corresponding point is calculated. In addition, since estimation reliability can be calculated, it is possible to reduce the ratio of incorrect motion vectors with respect to all of the motion vectors by removing corresponding points having a reliability lower than a threshold value from points used in the following processes as described later.

On the other hand, Non-Patent Literature 2 discloses a graph-cut based optical flow calculating approach. This approach requires a high calculation cost, but enables fine calculation of accurate corresponding points on the pictures. In addition, this approach is intended to perform bi-directional search, and estimate that a corresponding point having a correlation lower than a threshold value is a pixel in an occlusion region. For this reason, the corresponding point located in the occlusion region can be removed for the following processes. Thus, it is possible to reduce the ratio of incorrect motion vectors with respect to all of the motion vectors.

At this time, it is also good to calculate motion information for each of the pixels. In addition, in order to perform high speed processing, it is good to divide a picture in the form of a grid and calculate motion information only for pixels on a constant-interval grid. Alternatively, it is good to divide a picture into blocks, and calculate motion information for each block.

In this case, it is possible to use a method for calculating a motion vector assuming a translational motion of the block, Especially for an object which makes a rotational movement, it is possible to estimate pixel motions with high accuracy using an approach based on affine transform disclosed in Non-Patent Literature 3 than using the method assuming the translational motion of the block.

It is possible to calculate reliability when calculating a motion vector using the technique disclosed in Non-Patent Literature 1. For this reason, it is also good to use only pixels having motion information with a high reliability. In addition, when calculating a motion vector using the technique disclosed in Non-Patent Literature 2, it is possible to estimate occlusion and thus to use only motion information of pixels which are not occluded.

Here, generally, a motion estimation approach which can be used to generate an object tracking comment is a process using a model for determining the same object region between time-series images. For example, this process includes an assumption that a luminance difference is 0 between regions of the same object. Furthermore, the video 110 includes measurement noises and model errors, it is determined that a region pair which "satisfies the model most" corresponds to the same object, and a motion is calculated from the temporal position change of the same object.

In reality, there is a case where an object disappears from a frame in a video 110. In such a case, naturally, the motion of the object cannot be performed using the frame. In this case, if a region pair which "satisfies the model most" is calculated based on the aforementioned standard, the calculated motion is incorrect because there in no actual motion between the regions. However, in order to obtain information indicating whether a motion estimation is possible or impossible at arbitrary comment coordinates at an arbitrary comment time (which is a time point at which a comment is provided onto a video) included in the input comment information 111 received by the comment input receiving unit 102, there is a need to manually provide such information for all pixels in all frames of the video 110 in advance (in this case a person needs to check motions and determine whether motion estimation is possible), and to store the information in a server or the like. However, it is unrealistic to manually provide such information to the video 110 including a large number of frames and pixels. Accordingly, the object motion determining unit 107 determines whether a motion estimation is possible at each set of comment coordinates at a certain comment time included in the input comment information 111 received by the comment input receiving unit 102 before performing motion estimation. As a determination standard, another threshold value is set for a standard that "the model is satisfied at a predetermined level or higher" for the aforementioned motion estimation. In other words, it is general that a standard that "the model is satisfied below the predetermined level" is separately set.

Accordingly, the object motion determining unit 107 determines whether motion estimation is possible based on a first determination standard that the model used for the motion estimation is satisfied at a predetermined level or higher. Furthermore, when motion estimation is possible, the object motion determining unit 107 determines that a determination-target region pair which satisfies a second determination standard that "the model is satisfied most" corresponds to the same object, and calculates a motion from a temporal position change of the same object, On the other hand, the motion estimation approach using the aforementioned mechanism has a kind of trade-off relationship.

To set more strict standard for determining whether motion estimation is possible, it is possible to detect a "motion estimation impossible state" (a state in which motion estimation is impossible) even when a model error is comparatively small. When this standard for determining whether motion estimation is possible is set, that is, when allowance for difference is set to be small, a larger number of states in which "motion estimation is impossible" can be accurately detected. In this case, some states in which "motion estimation is actually possible" are erroneously determined to be states in which "motion estimation is impossible" due to influence of measurement noises or differences or the like between the model and actual images. For this reason, such erroneous determination causes an unnecessary stop of motion estimation, and reduces the length of a motion trajectory. In other words, tracking becomes difficult.

To facilitate tracking, motion estimation needs to be possible even when measurement noises or differences between the model and actual images are comparatively large. In the opposite case where a standard that excessively allows such noises and differences from the model is employed, that is, when the allowance for differences is large, motion estimation is continued even when the motion estimation should be temporarily stopped, for example, in the case where an object disappears from a frame in the video 110 and motion estimation is actually impossible. For this reason, there is a possibility that a motion trajectory including an incorrect motion estimation is generated (the motion trajectory is robust to noises and model errors).

Figure 9A:
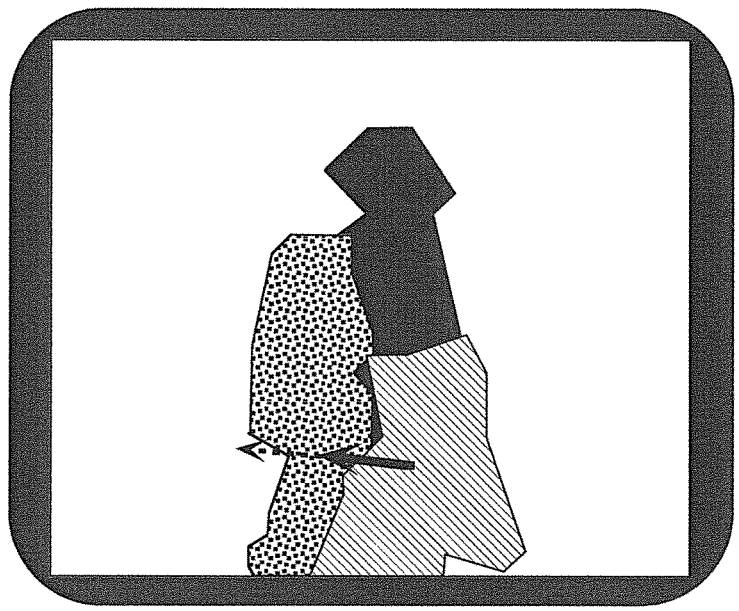
FIG. 9A is a diagram showing a motion trajectory in the case where allowance for noises or a model error is set to be low.
Figure 9B:
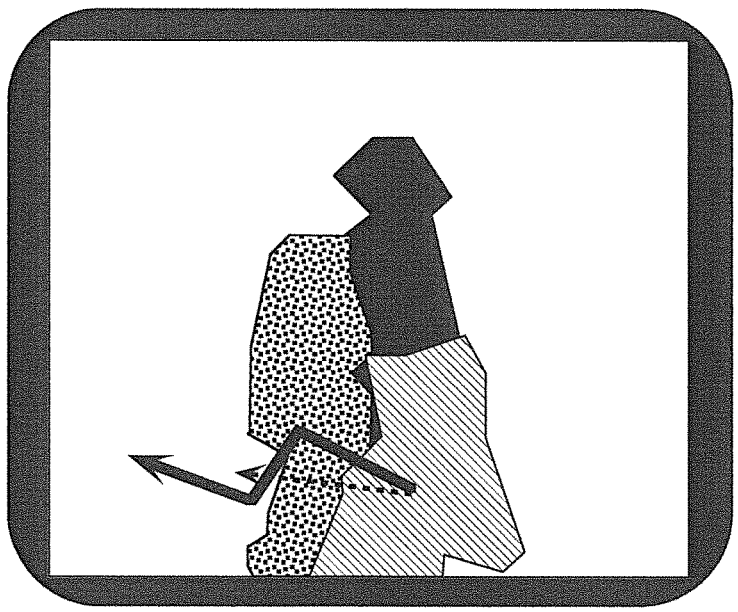
FIG. 9B is a diagram showing a motion trajectory in the case where allowance for noises or a model error is set to be high.

FIGS. 9A and 9B show that motion estimation has the above-described trade-off relationship between (i) robustness to noises and model errors and (ii) accurate determination of "motion estimation impossible states" due to occlusion or a scene change, In each of FIGS. 9A and 9B, the solid-line arrow shows a motion trajectory estimated using a general motion estimation approach, and the dotted-line arrow shows an actual (correct) motion trajectory. As shown in FIG. 9A, when a parameter of allowance for differences is set to be low, it is possible to accurately determine a "motion estimation impossible state" and suppress noises included in the motion trajectory, but the motion trajectory is likely to be shorter than the actual motion trajectory and object tracking time is also likely to be short. As shown in FIG. 9A, when a parameter of allowance for differences is set to be high, object tracking time is long, and the motion trajectory is longer than the one in FIG. 9A, but there is a possibility that the estimated motion trajectory is partly different from the correct motion trajectory. The readability of the comment becomes larger when the motion trajectory becomes longer as in FIG. 9B, but the comment can track the object more easily when the motion trajectory becomes more accurate.

In order to obtain a motion trajectory which achieves a time length and a position accuracy suitable for comment display in view of the trade-off relationship, there is a need to obtain an accurate motion trajectory having a minimum time length required for the user to visually recognize the character string of the comment, In other words, for example, assuming that the target time determined by the target time determining unit 106 is the minimum motion trajectory for each arbitrary set of coordinates at an arbitrary comment time, the motion trajectory equal to or closest to the time duration is calculated for each of sets of arbitrary coordinates of comments at arbitrary comment time.

Accordingly, the object motion determining unit 107 prepares a plurality of determination standard values each indicating that "the model is satisfied at a certain level or higher" in terms of noises or luminance differences from the model in motion estimation, calculates a plurality of motion trajectories using the respective threshold values, determines, as the coordinates of the object tracking comment, coordinates of one of the motion trajectories which has a time length closest to the target time determined by the target time determining unit 106. In this way, the aforementioned trade-off relationship is solved.

Parameters for adjusting the trade-off relationship in general motion estimation to place an influence on "trackability" are not limited to the aforementioned "model satisfaction levels (difference allowance levels)".

Other examples include a size of a window region for use in motion estimation. There is a trade-off relationship that motion estimation becomes more robust to partial luminance change or deformation when the size of the window region is increased although it becomes more difficult to detect a "motion estimation impossible state" when a specified part is occluded. For this reason, it is possible to use the window region size as a parameter for adjusting the time length of the motion trajectory. For example, the object motion determining unit 107 calculates a plurality of motion trajectories using a plurality of window region sizes, and determines, as the coordinates of the object tracking comment, coordinates of one of the motion trajectories which has a time length closest to the target time determined by the target time determining unit 106. In this way, it is possible to estimate the motion trajectory which has a time length sufficient for comment display and is maximum robust to noises or model errors.

Other examples include the number of feature values (image feature values) for use in motion estimation. Motion estimation using a larger number of feature values makes a resulting motion trajectory relatively robust to some of feature value changes. For example, the object motion determining unit 107 calculates a plurality of motion trajectories under conditions in which different numbers of feature values are used, and determines, as the coordinates of the object tracking comment, coordinates of one of the motion trajectories which has a time length closest to the target time determined by the target time determining unit 106. In this way, it is possible to estimate the motion trajectory which has the time length sufficient for comment display and is maximum robust to noises or model errors.

It is to be noted that window region sizes in Non-Patent Literature 1, block sizes based on affine transform in Non-Patent Literature 3 can be also used as parameters of "the window region sizes". Accordingly, to adjust these sizes means to adjust time lengths of the motion trajectories based on the aforementioned "window region sizes".

Other available parameters presenting "difference allowance levels" include: a confidence measure range k3 in Non-Patent Literature 1; occlusion penalty in Non-Patent Literature 2; and feature dissimilarity of texture or the like in Non-Patent Literature 3. When the confidence measure range is set to be a value of 0, a long motion trajectory is likely to be obtained. When feature dissimilarity is set to be larger, a longer motion trajectory is likely to be obtained. Accordingly, to adjust these sizes means to adjust time lengths of the motion trajectories based on the aforementioned "difference allowance levels".

Other available parameters representing "the numbers of feature values" include the numbers of feature points for use in estimation in Non-Patent Literature 3. By adjusting these parameters, it is possible to adjust the time lengths of the motion trajectories based on "the numbers of feature values". Other parameters except for the ones listed here may be used. It is also possible to adjust the time lengths of motion trajectories using a search range (in which a motion between pixels is estimated) in Non-Patent Literature 2. Motion estimation using such search ranges has a trade-off relationship between the time lengths of the motion trajectories and motion estimation accuracies (accuracies in the estimation of the motion trajectories) as in the case of the motion estimation using the aforementioned parameters. The use of a larger search range yields a longer motion trajectory with a possibility that the estimated motion trajectory is partly different from a correct motion trajectory. Known motion estimation approaches other than the above-described motion estimation approaches use parameters which are related to the time lengths of the motion trajectories and motion estimation accuracies, and can also be used.

The time lengths of the motion trajectories may be adjusted using only one kind of parameters such as threshold values for model errors, window region sizes, and the numbers of feature values as described above, and may be adjusted using some kinds of parameters in combination. As the simplest example, it is also good to set, in advance, two threshold values for model errors, two window region sizes, and two numbers of feature values, and determine, as the set of coordinates of an object tracking comment, one of the sets of coordinates which has the time length closest to the target time determined by the target time determining unit 106 among the estimated sets of coordinates obtained using a total of eight combinations of the parameters.

In addition, when it is difficult to assume a particular model such as a person whose motion as a tracking target is complex, it is also good to calculate motion trajectories using a plurality of motion estimation approaches, and determine, as the set of coordinates of an object tracking comment, one of the sets of coordinates which has the time length closest to the target time determined by the target time determining unit 106 among the estimated sets of coordinates obtained using the plurality of approaches. In this way, the motion trajectories which are more robust and closest to the target time are obtained for the various motions.

The above descriptions are given of approaches for calculating motion trajectories based on target time during which a given comment is displayed in the cases where motion estimation is inherently possible.

However, particularly in a general video 110 which is a video of a television program, a movie video recorded by a recorder, or the like, a motion to outside an image capturing range including a specified pixel or a specified region is likely to occur due to a scene change, occlusion by another object, auto-occlusion, or a movement of an object or a camera. In many cases where an object disappears from a specified pixel or region in a video, motion estimation becomes impossible at a time point before a target time. In each of these cases, only short motion trajectories are obtained even if parameters are adjusted, or the motion trajectories are estimated with significantly low accuracies. In order to generate an object tracking comment which is easy for the user to view, it is good to accurately determine "motion estimation impossible states" and introduce processes according to factors that caused the "motion estimation is impossible states".

In other words, when a time length is shorter than the target time (by a certain value or larger) even when the motion trajectory has the time length closest to the target time, the object motion determining unit 107 determines which one of the "occlusion" and "scene change" is the factor that causes the "motion estimation impossible state", and switches processes according to the result of the determination.

Where the factor is "occlusion" or "scene change" can be determined based on, for example, a temporal change between luminance histograms of the entire images. In other words, it is possible to determine a scene change occurred in a case where the luminance histograms are different significantly between frames (for example, a difference between the luminance histograms is a predetermined threshold value or larger), and to determine that occlusion occurred in another case. Alternatively, when time information of a scene change is attached as meta data to the video 110, it is also possible to determine whether a scene change occurred based on the meta data.

Figure 10A:
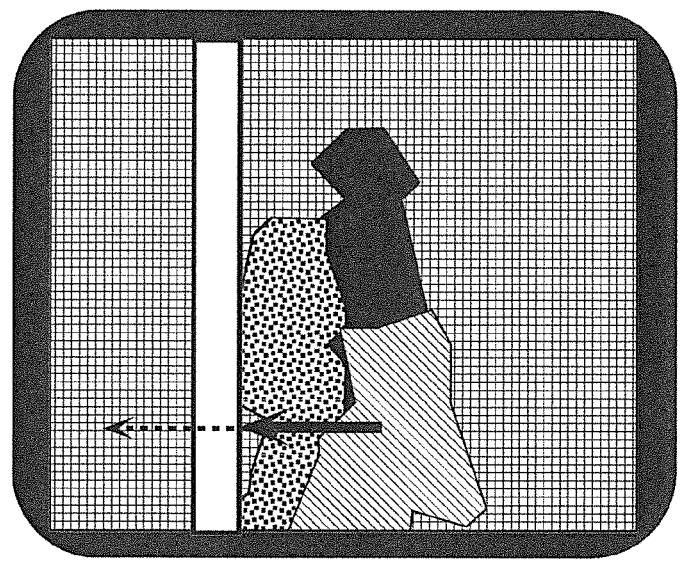
FIG. 10A is a diagram for explaining a motion estimating process performed in the case where occlusion occurred.

With reference to FIG. 10A, a description is given of a process performed by the object motion determining unit 107 when it is determined that the "occlusion" occurred. Although an object disappears in the case where motion estimation is temporarily stopped due to occlusion, there is a high possibility that the object keeps moving similarly before and after the disappearance at the back of an occluding object, in other words, there is a high possibility that the object still exists in an image of a video. Accordingly, the object motion determining unit 107 estimates a region in which the object is likely to be moving, for example, by extrapolating and extending a motion trajectory of the object so as to generate an object tracking trajectory. For example, linear interpolation can be used as the extrapolation.

Figure 10B:
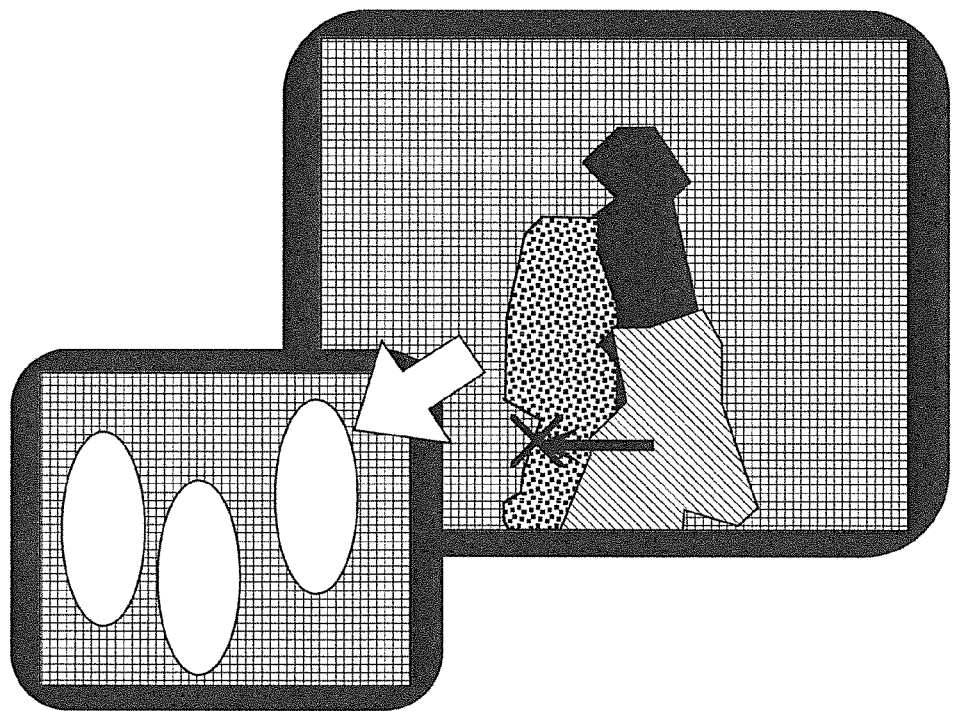
FIG. 10B is a diagram for explaining a motion estimating process performed in the case where a scene change occurred.

With reference to FIG. 10B, a description is given of a process performed by the object motion determining unit 107 when it is determined that the "scene change" occurred. In the case of the scene change, there is a high possibility that a tracking target object is not in a display screen of a camera or is in a place different from a previous place within the display screen. Accordingly, if the motion is extended in the same manner as in the case of the "occlusion", there is a high possibility that a resulting object tracking trajectory is strange to the user. Accordingly, the motion trajectory is not extended in the case of the "scene change". In other words, as an exception, the object motion determining unit 107 may determine that the motion trajectory to the frame at which the scene change occurred is the motion trajectory to be calculated although the time length of the determined motion trajectory is shorter than the target time. Likewise, a state in which motion estimation is impossible because an object moved to an end of an image is included in a "scene change". In this case, the motion is not extended for the following frames, and the motion trajectory to the frame is output.

Figure 11A:
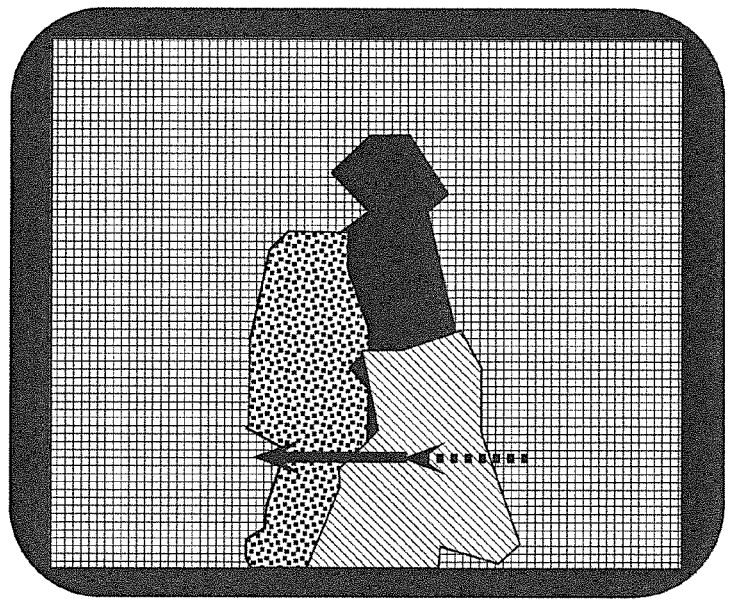
FIG. 11A is a diagram for explaining a process for extending a motion trajectory backward to time at which a first comment is provided.

In the case of an "occlusion", the object motion determining unit 107 may extend a motion trajectory according to a procedure shown below, information of a corresponding point is defined as information between two frames. For this reason, it is also possible to generate a motion trajectory backward in the time axis. In other words, as shown in FIG. 11A, when a motion trajectory can be extended backward from the comment start time, instead of performing linear interpolation, the object motion determining unit 107 may calculate the motion trajectory having the target time by advancing the comment start time. In this case, the resulting motion trajectory is long in the direction of time zones in which the object is viewed more clearly, and thus it is possible to provide object tracking coordinates for comment display that is satisfactory to the user.

Figure 11B:
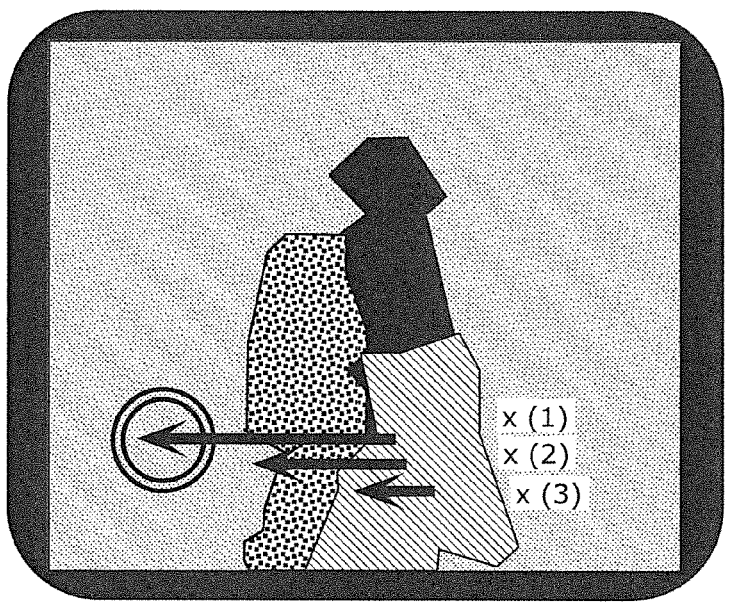
FIG. 11B is a diagram for explaining an example for calculating a motion trajectory that satisfies a target time within a predetermined pixel range.

In the case of an "occlusion", the object motion determining unit 107 may extend a motion trajectory according to a procedure shown below. It is generally assumed here that a similar motion is found in adjacent pixels regions which are close in an image. In view of this, as shown in FIG. 11B, the object motion determining unit 107 calculates a plurality of motion trajectories for pixels at coordinates within a predetermined pixel range R, from comment coordinates at certain comment time included in the input comment information 111 received by the comment input receiving unit 102. The object motion determining unit 107 may select the motion trajectory having the time length closest to the target time from among the motion trajectories, and calculate a motion shown by the selected motion trajectory as a motion of a specified pixel. By using information of surrounding pixels or blocks, it is possible to obtain object tracking coordinates which are more robust to noises.

Figure 12A:
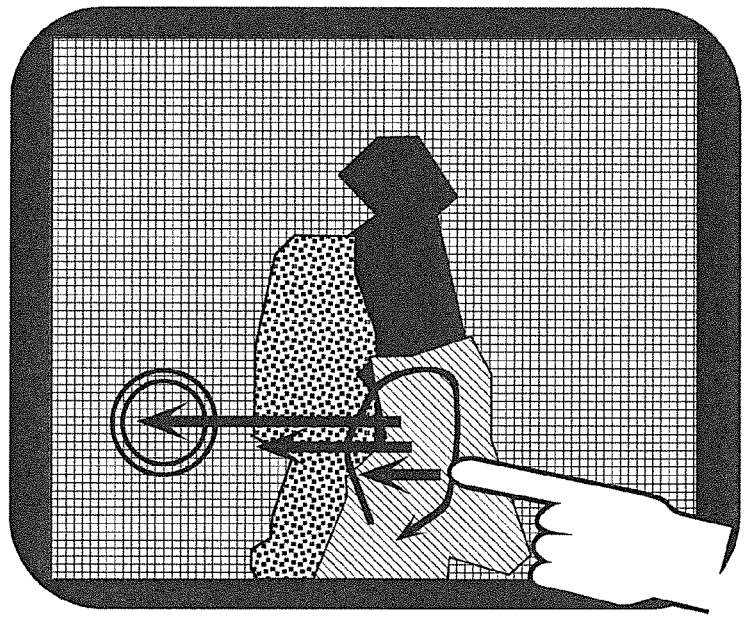
FIG. 12A is a diagram for explaining an example for calculating a motion trajectory that satisfies a target time within a user-specified range.

As another example, a plurality of sets of comment coordinates 112 to be received by the comment input receiving unit 102 may be specified as a region as shown in FIG. 12A. In this case, the sets of comment coordinates 112 corresponding to the specified region at certain comment time points included in the received input comment information 111 can be used instead of the predetermined pixel range R.

Figure 12B:
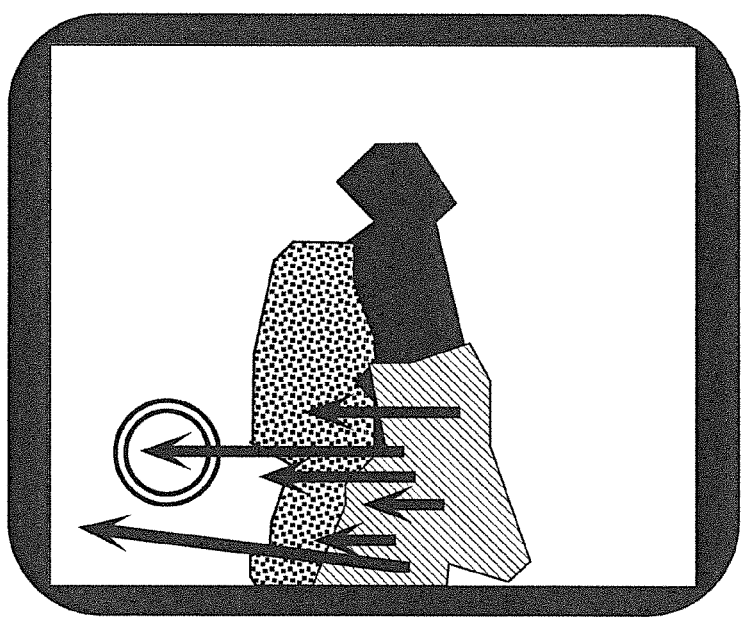
FIG. 12B is a diagram for explaining an example for calculating motion trajectories that start from the same region resulting from division by the dividing unit and determines one of the motion trajectories that satisfies a target time.

As another example, the object motion determining unit 107 includes a dividing unit which divides a picture into regions. As shown in FIG. 12B, the object motion determining unit 107 may use, instead of the predetermined pixel range R, a region including the sets of comment coordinates at the certain time points included in the input comment information 111 from among the regions obtained by the dividing unit.

For example, the dividing unit divides a picture into a plurality of regions, based on color similarities between pixels or blocks corresponding to motion trajectories. Here, a method may be used which divides a picture into a plurality of regions called "superpixels" based on the color similarities between pixels. Such superpixels can be calculated using a graph-based approach or the like. Detailed explanation for this processing procedure is not provided here because it is disclosed in Non-Patent Literature 4 etc. This approach is intended to divide a picture into small regions with efficient and global features maintained by estimating boundaries between the small regions based on a graph presenting the picture. This approach is less affected by occlusion and the division is more robust.

Particularly in a scene in which a moving body and a background are different in color, there is a high possibility that each of the regions is composed of only the moving body or the background (different color regions are highly likely to be divided into different sub classes). Thus, the picture can be divided correctly into region groups in each of which a similar motion is estimated.

In addition, it is also good to apply a motion-based dividing method. Specifically, the approach disclosed in Patent Literature 7 may be used. According to the approach, even when a moving body and a background are similar in color, it is possible to divide a picture correctly into subject region groups in each of which a similar motion is estimated.

Figure 13A:
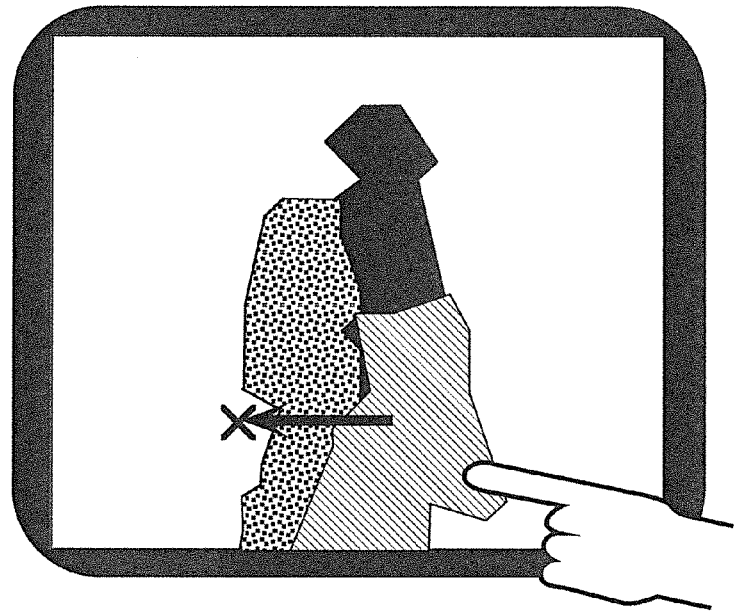
FIG. 13A is a diagram showing an example of a motion trajectory of a region in the case where a rough division is performed.
Figure 13B:
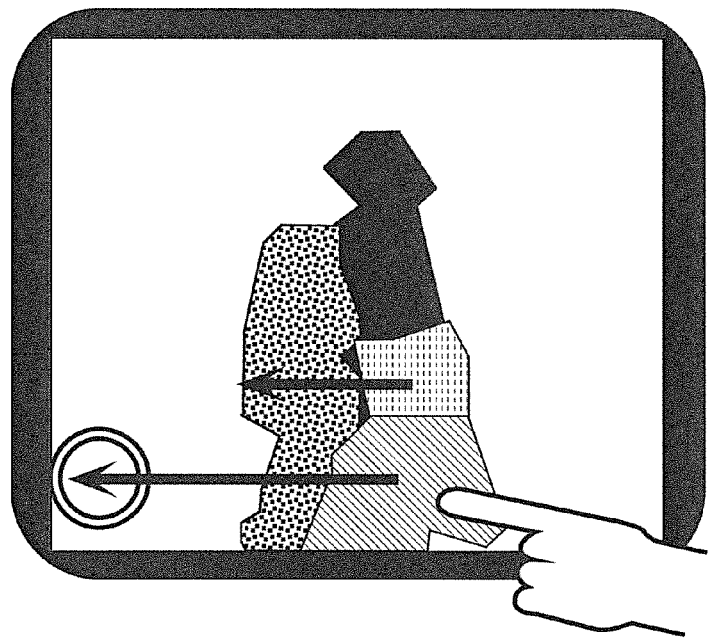
FIG. 13B is a diagram showing an example of a motion trajectory of a region in the case where a fine division is performed.

As another example, the object motion determining unit 107 includes a dividing unit, prepares a plurality of picture division results as shown in FIGS. 13A and 13B instead of calculating a plurality of motion trajectories, and calculates average motion trajectories and the minimum time lengths of the motion trajectories in the regions, from motions and tracking time lengths of the regions. The object motion determining unit 107 may select the region having the tracking time length closest to the target time from among regions divided from a region specified by the user, and calculate a motion in the selected region to be a motion of a specified pixel. In general, a division granularity and a tracking time length are in a trade-off relationship. For example, in the case of a rough segmentation as shown in FIG. 13A, a tracking time length in a specified region is shorter than a target time. However, by further dividing the specified region as shown in FIG. 13B, it is possible to approximate the tracking time length to the target time. As shown in FIG. 13B, a region corresponding to a head portion has a short tracking time length, but the user-specified region corresponding to a body portion has a long tracking time length. In this case, the result shown in FIG. 13B is used. Not only information of a pixel but also information of surrounding pixels are also used, and thus it is possible to obtain object tracking comment coordinates which are more robust to noises etc. As a dividing method, it is possible to use the approach based on color similarities or the approach based on motions as described above.

As shown in FIGS. 13A and 13B, even when a user-specified position is near an end of the region, the barycentric coordinates of the region is calculated for each frame as the simplest approach in order to provide a comment at a position intended by the user. In addition, it is also good to store a relative position of coordinates in a frame firstly specified by the user with respect to the barycentric coordinates of the region, and to thereby keep updating the tracking result. Here, a change in the size of the region increases a possibility that the coordinates updated by tracking is deviated from an actual region. Accordingly, in such a case, it is good to calculate, in advance, the barycentric coordinates of a rectangle region specified by, for example, an enclosure along the outer periphery thereof, adjust the position relationship between the user-specified coordinates and the barycentric coordinates of the rectangle region, based on changes of the size of the rectangular region or changes of the number of motion trajectories in the rectangle region, and update the tracking result based on the adjusted position relationship. Here, it is also good to calculate, in advance, the barycentric coordinates of the region in the firstly specified frame instead of calculating the barycentric coordinates of each of the regions, and determine a motion trajectory from the user-specified position, based on a relative position, using the result of calculating a motion trajectory from the barycentric coordinates of the region in the firstly specified frame.

The object motion determining unit 107 estimates motions of the object from a video in this exemplary non-limiting embodiment, but the object motion determining unit 107 may operate differently. For example, the object motion determining unit 107 may estimate motions between frames in a video using a plurality of parameters separately in advance, and store the estimated motions in the form of a database or a table in a storage device provided to the comment information generating apparatus or placed outside. The object motion determining unit 107 may obtain motion trajectories with reference to the database or the table wired or wirelessly instead of estimating motions in the video when receiving an input comment. FIG. 14 is a diagram showing an example of a database including information about motion trajectories and time length associated with each other. By performing motion estimation in advance, it is possible to perform object motion determination processes at higher speed when an input comment is received.

Figure 15:
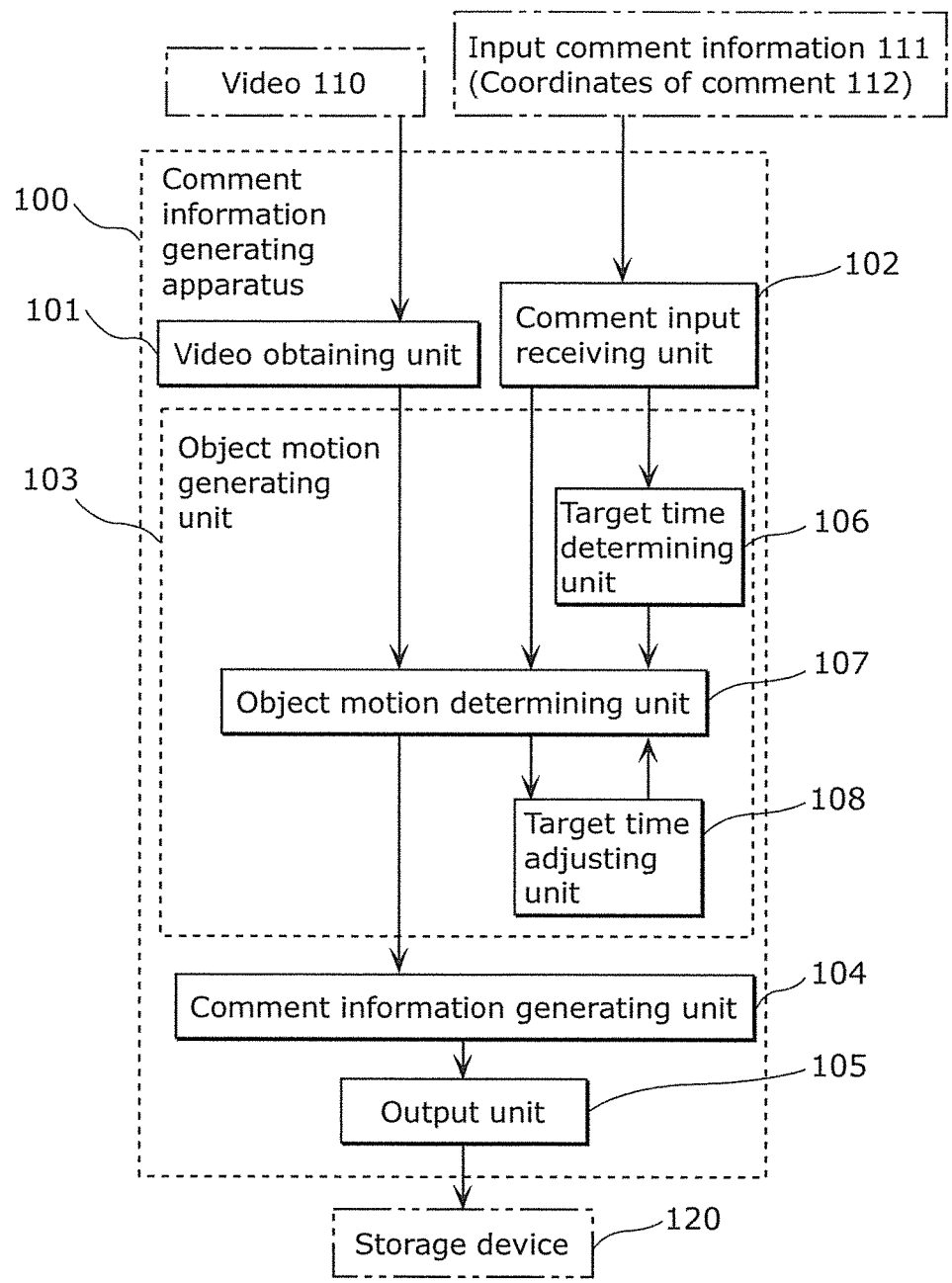
FIG. 15 is a block diagram showing a functional structure of a comment information generating apparatus including a target time adjusting unit.

As shown in FIG. 15, the object motion generating unit 103 may further include a target time adjusting unit 108 which adjusts the target time determined by the target time determining unit 106 based on the motion trajectories calculated by the object motion determining unit 107.

For example, a comment is more difficult to read and requires a longer reading time when it tracks and is displayed with an object that moves fast than when it tracks and is displayed with an object which moves slowly or remains still. This is why the target time is adjusted according to the speed of the object. In other words, the target time is adjusted to be longer for a comment provided to an object which moves a longer distance in a given time period.

More specifically, the target time adjusting unit 108 receives the motion trajectory determined by the object motion determining unit 107, and calculates the speed (the motion distance per unit time) of the object. As the simplest approach, the speed of the object may be presented as, for example, a value obtained by averaging lengths of motion vectors in frames.

When the calculated speed of the object is zero, the object remains still, and no adjustment of the target time is necessary.

In the other cases, the target time is adjusted to be longer based on the speed of the object. For example, it is good to double the target time for the possible maximum value as presenting the speed of the object, and to linearly calculate the target time corresponding to the calculated speed of the object, based on the target time in the case of zero speed. Another value other than the doubled one may be used depending on the size of the image. Other lengths for use as the possible maximum value as presenting the speed of the object include the length of a motion vector obtainable when a motion is estimated between a corner of a frame and an opposite corner of a next frame. If the kind of a scene is known in advance, it is also good to use the length of a motion vector obtainable when a motion is estimated between a center of a frame and a corner of a next frame according to the kind of the scene.

In addition, the standard may be set based on a viewing angle of a person. It is said that an image region which is clearly and visually recognized by a person (a central vision) who gazes the image region corresponds to a viewing angle of approximately 2 degrees. Here, the object remains within the image region of the central vision as long as the object is moving at a speed corresponding to the viewing angle, and thus the person can read the comment at a speed which is not so much different from zero speed. The speed of the object can be easily calculated from the viewing angle of the central vision, the distance between the display screen and the user at the time of viewing, and the size and resolution of the display screen.

For example, assuming that the distance between the display screen and the user's eyes at the time of viewing are approximately 40 cm, the size and resolution of the display size are 9.7 inches (19.71 cm×14.78 cm) and 2048×1536 pixels, respectively, the speed of the object is approximately 145 pixels. Accordingly, when the speed of the object exceeds 145 pixels, the target time may be increased. For example, it is good to calculate, as adjusted target time, a value obtained by multiplying the target time with a value obtained by dividing the speed of the object by the speed of the object at the central vision (145 pixels in the above example). In this way, the speed of the object is artificially matched the number of pixels corresponding to the viewing angle of the central vision.

The object motion determining unit 107 receives the adjusted target time, and calculates a new motion trajectory based on the adjusted target time according to the aforementioned method. In this way, it is possible to generate the motion trajectory which does not affect readability of the comment provided to the subject which is moving at a high speed.

Here, a processing loop for adjusting the target time by the target time adjusting unit 108 and the object motion determining unit 107 may be performed only once or plural times for increasing the accuracy.

With reference to FIG. 5, the comment information generating step S304 is executed by the comment information generating unit 104. The comment information generating unit 104 generates the comment information to be output, from the motion of the object estimated by the object motion generating unit 103 and the input comment information 111.

The comment information includes, as minimum information items, a time point at which the comment is provided, target coordinates of the comment, and sentence information in the input comment information 111, and values of sets of coordinates of the object tracking comment in a plurality of frames generated by the object motion generating unit 103. Furthermore, the comment information may include the color of the comment, the display shape (such as a balloon) of the comment, the font of the character string in the comment, etc. if these information items are included in the input comment information 111. In this way, it is possible to generate comment information which can be output and displayed in a style which is closer to the intension of the user.

Lastly, the output step S305 is executed by the output unit 105. The output unit 105 outputs the comment information generated by the comment information generating unit 104 to the storage device 120 wired or wirelessly through a communication path. More specifically, the output unit 105 stores the submitted comment character string and the position information of the object with which the comment is displayed by tracking which are included in the comment information, in a comment database included in the comment storage and distribution server.

In the case where input comment information items 111 to be processed are received sequentially, the comment information generating apparatus 100 may repeat the operations in the aforementioned Steps S301 to S307 each time one of the input comment information items 111 is received.

Here, the comment information generating apparatus 100 generates different motion trajectories according to the lengths of comments even if the comments are provided at the same coordinate position in the same frame, and thus can make a motion trajectory along which a comment makes a motion according to the length, when the video with the comment is displayed on the display device.

As described above, the comment information generating apparatus 100 determines, as the sets of coordinates of the object tracking comment, the sets of coordinates of the motion trajectory having the time length equal to or closest to the target time determined by the target time determining unit 106, and to thereby estimate the motion having the time length sufficient for displaying the comment and most robust to noises and model errors. In this way, it is possible to generate sets of coordinates for object tracking comment which can be viewed naturally as a result of temporally tracking the object specified by the user as the object to which the comment is provided.

In other words, the comment information generating apparatus 100 determines the target time during which the comment should be displayed, based on the comment, and estimates, for the object, the motion trajectory having the time duration that matches the target time. The estimated motion trajectory of the object can be used as the motion trajectory along which the comment tracks the object and is displayed with the object. For this reason, the user can read the comment within the display time when the video with the comment is displayed, and determine the object to which the comment is provided. Therefore, the comment information generating apparatus can generate comment information including a comment and a motion trajectory and increasing readability of the comment when displayed.

Each of the components in the above-described embodiment may be configured in the form of an exclusive hardware product, or may be realized by executing a software program suitable for the components. Each of the components may be realized by means of a program executing unit, such as a CPU and a processor, reading and executing the software program recorded on a recording medium such as a hard disk or a semiconductor memory. Here, the software program for realizing the image decoding apparatus according to each of the embodiments is a program described below.

The program causes a computer to execute a comment information generating method includes, receiving a video as an input; receiving inputs of position information of an object in the video received in the receiving and a comment that is displayed with the object and is caused to track the object; determining a target time during which the comment is displayed, based on the comment received in the receiving, the target time being a target value indicating a time length; determining, for the object shown by the position information, a motion trajectory having the time length that is substantially equal to the target time and along which the comment is displayed with the object and is caused to track the object; generating comment information to be output including the comment and the motion trajectory of the object determined in the determining of the motion trajectory; and outputting the comment information generated in the generating.

The herein disclosed subject matter is to be considered descriptive and illustrative only, and the appended Claims are of a scope intended to cover and encompass not only the particular embodiment disclosed herein, but also equivalent structures, methods, and/or uses.

INDUSTRIAL APPLICABILITY

A comment information generating apparatus and a comment information generating method according to the exemplary non-limiting embodiment disclosed herein are applicable to or as apparatuses and methods each involving generation of comment information to be output for a comment which tracks an object specified by a user in video communication on a network. For example, the comment information generating apparatus can be included in audio visual devices such as tablet PCs, smart phones, PCs, video cameras, TVs, and the like with which videos can be obtained or browsed through networks.

The invention claimed is:

1. A comment information generating apparatus comprising:
a video obtaining unit configured to receive a video;
a comment input receiving unit configured to receive inputs of position information of an object in the video received by the video obtaining unit and a comment that is displayed with the object and is caused to track the object starting from a predetermined timing;
a target time determining unit configured to determine a target time during which the comment is displayed, based on a length of the comment received by the comment input receiving unit, the target time being a target value indicating a time length;
an object motion determining unit configured to determine, for the object shown by the position information, a motion trajectory having a time length that is substantially equal to the target time and along which the comment is displayed with the object and is caused to track the object;
a comment information generating unit configured to generate comment information to be output including the comment and the motion trajectory of the object determined by the object motion determining unit; and
an output unit configured to output the comment information generated by the comment information generating unit,
wherein the object motion determining unit is configured to calculate a plurality of the motion trajectories for the object which is in the video and shown by the position information received by the comment input receiving unit, and determine, for the object, the motion trajectory which is selected as having a time length closest to the target time from among the plurality of the motion trajectories calculated for the object, based on a result of tracking the object.

2. The comment information generating apparatus according to claim 1,
wherein the target time determining unit is configured to calculate the target time which lengthens as the comment received by the comment input receiving unit lengthens, and
the output unit is configured to output the motion trajectory having the time length which lengthens as the comment input to the comment input receiving unit lengthens.

3. The comment information generating apparatus according to claim 2,
wherein the target time determining unit is configured to calculate, as the target time, a value obtained by multiplying a unit display time which is a predetermined display time per character and the number of characters in the comment received by the comment input receiving unit, and
the output unit is configured to output the motion trajectory having, as the time length, the value obtained by multiplying the unit display time and the number of characters, when the comment is input to the comment input receiving unit.

4. The comment information generating apparatus according to claim 2,
wherein the target time determining unit is further configured to calculate, as the target time, a predetermined visual recognition time required to visually recognize the characters, when the calculated target time is shorter than the predetermined visual recognition time, and
the output unit is configured to output, as the motion trajectory, a motion trajectory which has a time length larger than or equal to the visual recognition time even if the comment is shorter than the visual recognition time, by outputting the motion trajectory which corresponds to a longer one of the visual recognition time and a value obtained by multiplying a unit display time which is a predetermined display time per character and the number of characters in the comment when the comment is input to the comment input receiving unit.

5. The comment information generating apparatus according to claim 1,
wherein the output unit is configured to output a plurality of the motion trajectories which are different from each other for a plurality of the comments received by the comment input receiving unit, when the plurality of the comments have different numbers of characters and are provided at a same position in a same frame.

6. The comment information generating apparatus according to claim 1,
wherein the object motion determining unit is configured to calculate the plurality of the motion trajectories for the object which is in the video and shown by the position information received by the comment input receiving unit, using a plurality of motion estimation methods or motion estimation parameters.

7. The comment information generating apparatus according to claim 6,
wherein the object motion determining unit is configured to calculate a plurality of the motion trajectories for the object which is in the video and shown by the position information received by the comment input receiving unit, using, as the plurality of motion estimation parameters, one kind of (i) allowance parameters having different values which affect trackability of the object, (ii) search window regions having different sizes, and (iii) feature values having different values, and determine, for the object, the motion trajectory which is selected as having a time length closest to the target time from among the plurality of the motion trajectories calculated for the object.

8. The comment information generating apparatus according to claim 6,
wherein, in a case of occurrence of a "motion estimation impossible state" in which the motion trajectory closest to the target time cannot be determined for the object using the plurality of motion estimation methods or motion estimation parameters, the object motion determining unit is further configured to determine whether the "motion estimation impossible state" is caused by occlusion or a scene change, and switch between object motion determining methods based on a result of the determination.

9. The comment information generating apparatus according to claim 8,
wherein when determining that the "motion estimation impossible state" is caused by the occlusion, the object motion determining unit is configured to determine the motion trajectory having the time length closest to the target time for the object by extrapolating a motion trajectory of the object from a frame at which the occlusion occurred to a following frame, based on a motion trajectory of the object to the frame at which the occlusion occurred.

10. The comment information generating apparatus according to claim 8,
wherein when determining that the "motion estimation impossible state" is caused by the scene change, the object motion determining unit is configured to determine, for the object, a motion trajectory to a frame at which the scene change occurred as the motion trajectory to be output.

11. The comment information generating apparatus according to claim 8,
wherein the object motion determining unit is configured to determine that the "motion estimation impossible state" is caused by the scene change, when a difference between luminance histograms of frames composing the video is larger than or equal to a predetermined threshold value, and that the "motion estimation impossible state" is caused by the occlusion, when a difference between the luminance histograms of the frames composing the video is smaller than the predetermined threshold value.

12. The comment information generating apparatus according to claim 6,
wherein when a motion trajectory among the plurality of the motion trajectories of the object calculated using the plurality of motion estimation methods or motion estimation parameters is shorter than the time length corresponding to the target time by a predetermined time or more, the object motion determining unit is configured to determine, as the motion trajectory, a motion trajectory which is closest to the target time by connecting, to a forward end of a motion trajectory of the object, a motion trajectory which is estimated between (i) the frame having the position information and the input comment received by the comment input receiving unit and including a position which is shown by the position information received by the comment input receiving unit and (ii) a frame positioned backward on a time axis.

13. The comment information generating apparatus according to claim 6,
wherein when a motion trajectory among the plurality of the motion trajectories of the object calculated using the plurality of motion estimation methods or motion estimation parameters is shorter than the time length corresponding to the target time by a predetermined time or more, the object motion determining unit is configured to determine a motion trajectory having a time length closest to the target time as the motion trajectory of the object shown by the position information received by the comment input receiving unit from among the plurality of the motion trajectories calculated for the object starting at positions within a predetermined distance range from positions shown by the position information of the object received by the comment input receiving unit.

14. The comment information generating apparatus according to claim 6,
wherein when a motion trajectory among the plurality of the motion trajectories of the object calculated using the plurality of motion estimation methods or motion estimation parameters is shorter than the time length corresponding to the target time by a predetermined time or more, the object motion determining unit is configured to determine a motion trajectory having a time length closest to the target time as the motion trajectory of the object shown by the position information received by the comment input receiving unit from among the plurality of the motion trajectories calculated for the object based on positions within a user-specified range including positions shown by the position information of the object received by the comment input receiving unit.

15. The comment information generating apparatus according to claim 6,
wherein when a motion trajectory among the plurality of the motion trajectories of the object calculated using the plurality of motion estimation methods or motion estimation parameters is shorter than the time length corresponding to the target time by a predetermined time or more, the object motion determining unit is configured to divide the object into regions, and determine a motion trajectory having a time length closest to the target time as the motion trajectory of the object, the determined motion trajectory ending in one of the regions.

16. The comment information generating apparatus according to claim 1,
wherein the object motion determining unit is further configured to determine, as the motion trajectory, a motion trajectory having a time length closest to the target time, modify the determined motion trajectory for the object to be a virtual motion trajectory from a position at which a comment received by the comment input receiving unit is provided, based on a relative position relationship between the position at which the comment is provided and a center of gravity of the object shown by the position information received by the comment input receiving unit, and output the modified motion trajectory.

17. A comment information generating apparatus comprising:
a video obtaining unit configured to receive a video;
a comment input receiving unit configured to receive inputs of position information of an object in the video received by the video obtaining unit and a comment that is displayed with the object and is caused to track the object starting from a predetermined timing;
a target time determining unit configured to determine a target time during which the comment is displayed, based on a length of the comment received by the comment input receiving unit, the target time being a target value indicating a time length;
an object motion determining unit configured to determine, for the object shown by the position information, a motion trajectory having a time length that is substantially equal to the target time and along which the comment is displayed with the object and is caused to track the object;
a comment information generating unit configured to generate comment information to be output including the comment and the motion trajectory of the object determined by the object motion determining unit;
an output unit configured to output the comment information generated by the comment information generating unit; and
a target time adjusting unit configured to adjust the target time by lengthening the target time with an increase in a motion velocity of the object, based on the motion trajectory of the object determined by the object motion determining unit,
wherein the object motion determining unit is further configured to determine, for the object, a new motion trajectory having a time length corresponding to the target time adjusted by the target time adjusting unit, the new motion trajectory being for displaying the comment with the object shown by the position information and causing the comment to track the object, based on a result of tracking the object.

18. A non-transitory computer-readable recording medium storing thereon a program causing a computer to function as a comment information generating apparatus, the comment information generating apparatus comprising:
a video obtaining unit configured to receive a video;
a comment input receiving unit configured to receive inputs of position information of an object in the video received by the video obtaining unit and a comment that is displayed with the object and is caused to track the object starting from a predetermined timing;
a target time determining unit configured to determine a target time during which the comment is displayed, based on a length of the comment received by the comment input receiving unit, the target time being a target value indicating a time length;
an object motion determining unit configured to determine, for the object shown by the position information, a motion trajectory having a time length that is substantially equal to the target time and along which the comment is displayed with the object and is caused to track the object;
a comment information generating unit configured to generate comment information to be output including the comment and the motion trajectory of the object determined by the object motion determining unit; and
an output unit configured to output the comment information generated by the comment information generating unit,
wherein the object motion determining unit is configured to calculate a plurality of the motion trajectories for the object which is in the video and shown by the position information received by the comment input receiving unit, and determine, for the object, the motion trajectory which is selected as having a time length closest to the target time from among the plurality of the motion trajectories calculated for the object, based on a result of tracking the object.

\* \* \* \* \*